(12) United States Patent
Kobayashi

(10) Patent No.: US 9,544,868 B2
(45) Date of Patent: Jan. 10, 2017

(54) RADIO COMMUNICATION SYSTEM, RADIO TERMINAL, RADIO NETWORK, RADIO COMMUNICATION METHOD AND PROGRAM

(75) Inventor: Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 13/520,990

(22) PCT Filed: Jan. 5, 2011

(86) PCT No.: PCT/JP2011/050049
§ 371 (c)(1),
(2), (4) Date: Aug. 30, 2012

(87) PCT Pub. No.: WO2011/083802
PCT Pub. Date: Jul. 14, 2011

(65) Prior Publication Data
US 2013/0005356 A1 Jan. 3, 2013

(30) Foreign Application Priority Data
Jan. 7, 2010 (JP) .................................. 2010-002367

(51) Int. Cl.
*H04W 24/00* (2009.01)
*H04W 64/00* (2009.01)
(Continued)

(52) U.S. Cl.
CPC .......... *H04W 64/003* (2013.01); *G01S 5/0027* (2013.01); *H04W 24/10* (2013.01)

(58) Field of Classification Search
USPC ..... 455/456.1, 456.3, 423, 67.11, 574, 456.2
See application file for complete search history.

(56) References Cited

U.S. PATENT DOCUMENTS 5,987,306 A * 11/1999 Nilsen et al. ............... 455/67.11
7,561,101 B1 * 7/2009 Tester et al. ............. 342/357.77
(Continued)

FOREIGN PATENT DOCUMENTS

JP 2004-040171 A 2/2004
JP 2004-214875 A 7/2004
(Continued)

OTHER PUBLICATIONS

"3$^{rd}$ Generation Partnership Project; Technical Specification Group Radio Access Network; Study on Minimization of drive-tests in Next Generation Networks," 3GPP TR 36.805, Aug. 2009, pp. 1-18, V1.2.0.
(Continued)

*Primary Examiner* — Mong-Thuy Tran
(74) *Attorney, Agent, or Firm* — Sughrue Mion, PLLC

(57) ABSTRACT

A radio terminal, which is operative to perform a measurement on the basis of a measurement condition designated by a radio network and to report the result of the measurement, comprises: a position-determination precision calculating means for calculating a position-determination precision of the radio terminal; a required position-determination precision holding means for holding a required position-determination precision related to a condition of position-determination precision; and a measurement reporting control means for comparing the required position-determination precision with the calculated position-determination precision and for controlling the execution of at least one of the radio terminal's measurement and the radio terminal's reporting of the measurement result to the radio network.

22 Claims, 14 Drawing Sheets

(51) Int. Cl.
*G01S 5/00* (2006.01)
*H04W 24/10* (2009.01)

(56) References Cited

U.S. PATENT DOCUMENTS

| | | | | |
|---|---|---|---|---|
| 9,026,094 | B2* | 5/2015 | Siomina | G01S 5/0268 455/414.2 |
| 2004/0185870 | A1* | 9/2004 | Matsuda | 455/456.1 |
| 2006/0211430 | A1* | 9/2006 | Persico | 455/456.1 |
| 2006/0258369 | A1* | 11/2006 | Burroughs | G01S 5/0205 455/456.1 |
| 2007/0037587 | A1* | 2/2007 | Mohi et al. | 455/456.5 |
| 2007/0159384 | A1* | 7/2007 | Kangas | G01S 19/40 342/357.23 |
| 2008/0139219 | A1* | 6/2008 | Boeiro et al. | 455/456.2 |
| 2009/0005061 | A1* | 1/2009 | Ward | G01S 5/021 455/456.1 |
| 2009/0066564 | A1 | 3/2009 | Burroughs et al. | |
| 2009/0069032 | A1* | 3/2009 | Rowland et al. | 455/456.2 |
| 2009/0167598 | A1* | 7/2009 | Morisaki | 342/357.09 |
| 2009/0303113 | A1* | 12/2009 | Alizadeh-Shabdiz | 342/357.01 |
| 2009/0325566 | A1* | 12/2009 | Bell et al. | 455/419 |
| 2010/0120435 | A1* | 5/2010 | Mia | H04W 64/003 455/440 |
| 2010/0175116 | A1* | 7/2010 | Gum | 726/6 |
| 2010/0190488 | A1* | 7/2010 | Jung et al. | 455/424 |
| 2011/0111772 | A1* | 5/2011 | Tysowski | G01S 5/00 455/456.3 |
| 2011/0175773 | A1* | 7/2011 | Syrjarinne et al. | 342/357.25 |
| 2012/0064878 | A1* | 3/2012 | Castro Castro et al. | 455/418 |

FOREIGN PATENT DOCUMENTS

| | | | | |
|---|---|---|---|---|
| JP | 2004-235762 A | | 8/2004 | |
| JP | EP 1753255 | * | 7/2005 | G01S 5/14 |
| JP | EP 2200352 | * | 10/2008 | H04W 4/00 |
| JP | 2008-298790 A | | 12/2008 | |
| WO | 2009/048088 A1 | | 4/2009 | |

OTHER PUBLICATIONS

"Email discussion summary [66b#7] LTE-UMTS: Minimisation of drive tests," 3GPP TSG-RAN WG2 meeting #67, Aug. 2009, pp. 1-35, Shenzhen, China.

Communication dated Jan. 13, 2016, issued by the Japan Patent Office in counterpart Japanese Application No. 2011-549009.

Communication dated Oct. 17, 2016 from the European Patent Office in counterpart application No. 11731800.6.

Huawei, "Clarification on location information," 3GPP TSG RAN2 Meeting #68, R2-096601; Jeju, Korea, Nov. 9-13, 2009 (13 pages total).

* cited by examiner

RADIO COMMUNICATION SYSTEM, RADIO TERMINAL, RADIO NETWORK, RADIO COMMUNICATION METHOD AND PROGRAM

CROSS REFERENCE TO RELATED APPLICATION

This application is a National Stage of International Application No. PCT/JP2011/050049 filed Jan. 5, 2011, claiming priority based on Japanese Patent Application No. 2010-002367 filed Jan. 7, 2010, the contents of all of which are incorporated herein by reference in their entirety.

TECHNICAL FIELD

The present invention relates to a radio communication system, a radio terminal, a radio network, a radio communication method, and a program therefor.

BACKGROUND ART

As a rule, in a radio communication network representing a mobile telephone network, a drive-test for performing a measurement within an area with a vehicle having a special-purpose measurement apparatus installed therein is performed for a purpose of investigating radio characteristics (a received quality of a radio wave coming from a radio base station and events such as a reception error and an access failure) within the area.

It is being investigated in a 3GPP (3rd Generation Partnership Project) to cause general radio terminals to measure/report information conventionally collected by drive-tests or information similar hereto so as to reduce operation cost (OPEX) that is needed for the drive-tests (Drive-Test) to be performed by operators (Non-patent literature 1). The final goal of this investigation is to minimize execution of the drive-tests (Minimization of Drive-Tests: MDT). In the feasibility study of the MDT, how the radio terminals are caused to measure the information and how the radio terminals are caused to report a log of the measurement results and the past measurement results are being discussed. Currently, the periodical reporting technique and the event triggered measurement reporting technique are specified. Additionally, what is herein called "the measurement" by the radio terminal also includes an operation of "detecting" some situations.

In the periodical technique, a radio network (for example, a radio base station) previously notifies a measurement interval and/or a report interval to the radio terminal, and the radio terminal performs the measurement and/or the reporting according hereto. Herein, as the periodic measurement, there exist, for example, periodical received quality measurements of downlink pilot signals (Periodical downlink pilot measurements) and the like.

In the technology of the Non-patent literature 1, the radio terminal periodically performs the received quality measurement of the downlink pilot signals of serving cells (Periodical downlink pilot measurements), and periodically reports the measurement result. Herein, the so-called received quality measurement of the pilot signals is equivalent to measuring the radio characteristics such as RSRP (Reference Signal Received Power), RSRQ (Reference Signal Received Quality), CPICH RSCP (Common Pilot Channel Received Signal Code Power), and CPICH Ec/No (Ec: received energy per chip, No: Noise power density).

In addition, the radio terminal having a positioning function is instructed to periodically perform positioning (measurement of locations) as well and to report location information together with a measurement result of the above-mentioned radio characteristics.

The details of the Non-patent literature 1 will be explained with 3GPP LTE (Long Term Evolution) exemplified by referencing FIG. 15.

The radio terminal (UE: User Equipment) notifies a function the radio terminal itself supports to the radio base station (eNB: enhanced Node B) (UE capability report). For example, the radio terminal notifies whether or not the positioning function the radio terminal itself supports, for example, GPS (Global Positioning System) and OTDOA (Observed Time Difference Of Arrival) and the like are utilizable.

A radio network (EPC: Evolved Packet Core, for example, NM: Network Manager) notifies a measurement policy (Measurement policy) to the eNB (Policy indication), and the eNB gives an instruction for the measurement and the reporting to the UE according to the above policy (Measurement, logging and reporting configuration). Herein, it is assumed that the measurement and the reporting are performed at an interval T1 and at an interval T2, respectively.

The UE performs the received quality measurement of the downlink pilot signals (for example, the RSRP) and the positioning at the interval T1 according to the above policy, and maintains its measurement result as a measurement log(Measurement and logging). And, the UE reports the above measurement log to the eNB at the interval T2 (Measurement log report). In addition, the eNB reports the report coming from the UE to an upper NW (Log report).

Hereinafter, likewise, the UE repeats a series of the operations of the measurement—the logging—the reporting.

Herein, for determining a lapse of the interval T1/T2, for example, a timer is used. Further, the UE finishes the above series of the operations when a period or a number of times of the reports previously notified from the eNB is satisfied, or when an instruction is given by the eNB.

Additionally, in some cases, for not only a serving cell but also a neighboring cell, the received quality measurement of the downlink pilot signals is performed periodically.

On the other hand, in the event trigger technique, the radio network (for example, the radio base station) previously notifies the condition, being a trigger for the measurement and/or the reporting, to the radio terminal, and the radio terminal performs the measurement and/or the reporting when the above condition is satisfied. Herein, as the condition, being the trigger, there exist the radio characteristics such as a broadcast channel reception error (Broadcast Channel Failure), a paging channel reception error (Paging Channel Failure), the received quality of the serving cell becoming worse than a predetermined threshold (Serving Cell becomes worse than threshold), and a failure of a random access (Random access failure) (Non-patent literature 2). Additionally, the radio terminal reports information as well of the time when the trigger has occurred together with the measurement result.

In addition, the radio terminal having the positioning function is instructed to perform the positioning as well at a time point when the trigger has occurred, and to report location information.

In the technology of the Non-patent literature 2, the radio terminal performs the measurement when the event is triggered, stores the result of the measurement as the measurement log, and reports it when the event is triggered. For example, it is assumed that the condition under which the trigger of the measurement occurs is the paging channel reception error (Paging Channel Failure), and the radio terminal performs the received quality measurement of the downlink pilot signals of the serving cell and the positioning when the above condition is satisfied. Further, it is assumed that the condition under which the trigger of the reporting occurs is, for example, a time point when a predetermined amount of the measurement logs have been accumulated, and the radio terminal reports the measurement log to the radio network when the above condition is satisfied.

The details of the technology of the Non-patent literature 2 will be explained with the 3GPP LTE exemplified by referencing FIG. 16.

The UE notifies functions the UE itself supports to the eNB (UE capability report). For example, the UE notifies whether or not the positioning function the UE itself supports, for example, the GPS (Global Positioning System) and the OTDOA (Observed Time Difference Of Arrival) and the like are utilizable.

The EPC (for example, NM) notifies a measurement policy (Measurement policy) to the eNB (Policy indication), and the eNB gives an instruction for the measurement and the reporting to the UE according to the above policy (Measurement, logging and reporting configuration). Herein, as one example, it is assumed that the condition, being the trigger of the measurement is the paging channel reception error, and the trigger of the reporting is a time point when the amount of the measurement logs (a memory capacity of the terminal used for the measurement logs) has reached a predetermined value.

The UE periodically receives the paging channels, performs the received quality measurement (for example, the RSRP) of the downlink pilot signals of the serving cell and the positioning thereof according to the above instruction when the paging channel reception error (Paging Failure) occurs, and maintains its result together with the time of the occurrence of the paging channel reception error as the measurement log(Measurement and logging). And, when the amount of the measurement logs has reached a predetermined value, the UE reports the above measurement logs to the eNB (Measurement log report). In addition, the eNB reports the report coming from the UE to the upper NW (Log report).

Hereinafter, likewise, the UE repeats a series of the operations of the measurement—the logging—the reporting.

Herein, the UE finishes the above series of the operations when the UE is instructed to do so by the eNB.

Additionally, in some cases, for not only the serving cell but also the neighboring cell, the received quality measurement of the downlink pilot signals when the trigger of the measurement occurs is performed periodically.

Further, as the method of the positioning, the GPS (Global Positioning System) that performs the positioning using an artificial satellite orbiting over the earth, the OTDOA (Observed Time Difference Of Arrival) that performs the positioning based on a delay time of the radio wave that arrives from the radio base station, and the like are being investigated.

CITATION LIST

Non-Patent Literature

NON-PTL 1: 3GPP TR36.805v1.2.0
NON-PTL 2: 3GPP R2-094291

SUMMARY OF INVENTION

Technical Problem

When the information measured by the radio terminal is used as a substitute for the drive-test, the location at which the above measurement has been performed becomes important information in addition to the measurement values of the radio characteristics such as the received quality of the downlink pilot signals.

By the way, as a rule, when the positioning is performed using the GPS etc., a dispersion of positioning accuracies occurs dependent on the location in which the positioning is performed and the time when the positioning is performed. For example, it is known that a dispersion of the positioning accuracy occurs due to an influence of shielding of the GPS satellite by building, an ionospheric delay, and the like in a case of the GPS. The location information having a low positioning accuracy and additional information of the radio characteristics etc. associated with to the above location information are not useful as a substitute for the drive-test that aims for grasping the radio characteristics within the area.

On the other hand, the measurement/the reporting for the MDT is basically a support function that the radio network (operator) expects for the radio terminal, and is an unnecessary operation from a viewpoint of a user. For this, it is desirable to make every effort for suppressing the measurement/the reporting related to the unuseful information as mentioned above, and to alleviate a load on the radio terminal.

Thereupon, the present invention has been accomplished in consideration of the above-mentioned problems, and an object thereof is to provide a radio communication system, a radio terminal, a radio network, a radio communication method, and a program therefor capable of collecting information that the radio network side requires while alleviating a load on the terminal caused by the measurement and/or the reporting, and/or deleting the reporting of the information with a low necessity.

Solution to Problem

The present invention is a radio terminal that performs measurement based on a measurement condition to be indicated by a radio network, and reports a measurement result, comprising: positioning accuracy calculating means that calculates a positioning accuracy of the radio terminal; required positioning accuracy maintaining means that maintains a required positioning accuracy related to a condition of the positioning accuracy; and measurement reporting controlling means that compares said required positioning accuracy with said calculated positioning accuracy, and controls execution of at least one of the measurement and the reporting of said measurement result to the radio network by the radio terminal.

The present invention is a radio terminal that performs measurement based on a measurement condition to be indicated by a radio network, and reports a measurement result, comprising: positioning accuracy calculating means that calculates a positioning accuracy of the radio terminal; and measurement reporting controlling means that controls execution of at least one of the measurement and the reporting of said measurement result to the radio network by the radio terminal based on said calculated positioning accuracy.

The present invention is a radio network in a radio communication system in which a radio terminal performs measurement based on a measurement condition to be indicated by the radio network and reports a measurement result, comprising a required positioning accuracy notifying means that notifies to the radio terminal a required positioning accuracy related to a positioning accuracy of the radio terminal, being a condition for controlling execution of at least one of the measurement and the reporting of said measurement result to the radio network by the radio terminal.

The present invention is a radio communication system in which a radio terminal performs measurement based on a measurement condition to be indicated by the radio network and reports a measurement result: wherein the radio network comprises a required positioning accuracy notifying means that notifies to the radio terminal a required positioning accuracy related to a condition of a positioning accuracy for controlling execution of at least one of the measurement and the reporting of said measurement result to the radio network by the radio terminal; and wherein the radio terminal comprises: positioning accuracy calculating means that calculates a positioning accuracy of the radio terminal; and measurement reporting controlling means that compares said required positioning accuracy with said calculated positioning accuracy, and controls execution of at least one of the measurement and the reporting of said measurement result to the radio network by the radio terminal.

The present invention is a radio communication system in which a radio terminal performs measurement based on a measurement condition to be indicated by the radio network and reports a measurement result, comprising: positioning accuracy calculating means that calculates a positioning accuracy of the radio terminal; and measurement reporting controlling means that controls execution of at least one of the measurement and the reporting of said measurement result to the radio network by the radio terminal based on said calculated positioning accuracy.

The present invention is a radio communication method of performing, by a radio terminal, measurement based on a measurement condition to be indicated by a radio network, and reporting, by a radio terminal, a measurement result, comprising: notifying, by the radio network, a required positioning accuracy related to a condition of a positioning accuracy to the radio terminal; and calculating, by the radio terminal, the positioning accuracy of the radio terminal, comparing, by the radio terminal, said required positioning accuracy notified from said radio network with said calculated positioning accuracy, and controlling, by the radio terminal, execution of at least one of the measurement and the reporting of said measurement result to the radio network by the radio terminal.

The present invention is a radio communication method of performing, by a radio terminal, measurement based on a measurement condition to be indicated by a radio network, and reporting, by a radio terminal, a measurement result, comprising: calculating a positioning accuracy of the radio terminal; and controlling execution of at least one of the measurement and the reporting of said measurement result to the radio network by the radio terminal based on said calculated positioning accuracy.

The present invention is a program of a radio terminal that performs measurement based on a measurement condition to be indicated by the radio network and reports a measurement result, causing the radio terminal to execute the processes: calculating positioning accuracy of the radio terminal; and comparing a required positioning accuracy related to a condition of the positioning accuracy with said calculated positioning accuracy, and controlling execution of at least one of the measurement and the reporting of said measurement result to the radio network by the radio terminal.

The present invention is a program of an information processing device in a radio communication system in which a radio terminal performs measurement based on a measurement condition to be indicated by the radio network and reports a measurement result, causing said information processing device to execute a process of notifying to the radio terminal a required positioning accuracy related to a positioning accuracy of the radio terminal, being a condition for controlling execution of at least one of the measurement and the reporting of said measurement result to the radio network by the radio terminal.

Advantageous Effect of Invention

The present invention makes it possible to collect information that the radio network side requires while alleviating a load on the terminal caused by the measurement and/or the reporting, and/or deleting the reporting of the information with a low necessity.

DESCRIPTION OF EMBODIMENTS

The exemplary embodiments of the present invention will be explained.

In this exemplary embodiment, the radio terminal executes the positioning, calculates the positioning accuracy, judges whether the above positioning accuracy satisfies a required positioning accuracy (Positioning accuracy requirement), and controls the measurement and/or the reporting of the log(measurement log) of the measurement result by the radio terminal (Measurement log report).

Figure 1:
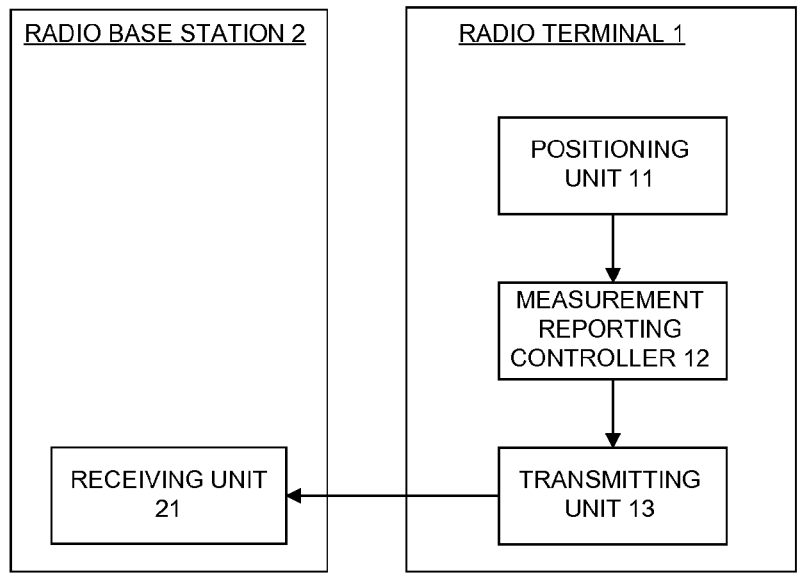
FIG. 1 is a schematic view of the radio communication system in this exemplary embodiment.

FIG. 1 is a schematic view of the radio communication system in this exemplary embodiment.

The radio communication system of this exemplary embodiment includes a radio terminal 1 and a radio base station 2.

The radio terminal 1 includes a positioning unit 11 that executes the positioning and calculates the positioning accuracy, a measurement reporting controller 12 that maintains a required positioning accuracy, compares the above required positioning accuracy with the positioning accuracy calculated by the positioning unit 11, and controls execution of at least one of the measurement and the reporting of the log(measurement log) of the measurement result by the radio terminal 1 (Measurement log report), and a transmitting unit 13 that transmits the measurement log to the radio base station 2.

Further, the radio base station 2 includes a receiving unit 21 that receives the measurement log etc. coming from the radio terminal 1.

Upon mentioning an example of the above-described required positioning accuracy, Dilution OF Precision (DOP) which indicates a geometric arrangement of the GPS satellites viewed from the radio terminal can be used in a case of a general GPS. The DOP signifies that the larger the numerical value of the DOP, the lower the positioning accuracy, and the smaller the numerical value of the DOP, the higher the positioning accuracy. Various indices are present in the DOP dependent on how to define it. For example, there exists PDOP (Position DOP) to signify a dilution rate of the three-dimensional positioning accuracy, HDOP (Horizontal DOP) to signify a dilution rate of the positioning accuracy in a horizontal direction, VDOP (Vertical DOP) to signify a dilution rate of the positioning accuracy in a vertical direction, and the like.

Further, the positioning accuracy can be calculated from the DOP using the following relation equation.

$$\text{Positioning accuracy} = \text{DOP} \times \text{ranging accuracy}$$

Herein, the so-called ranging accuracy is a measurement accuracy at the moment that a receiver measures distances between the above receiver and the GPS satellites. For example, the positioning accuracy in the horizontal direction can be roughly calculated as a value obtained by multiplying the dilution rate of the positioning accuracy in the horizontal direction (HDOP) by the ranging accuracy, and 8 m is obtained as the positioning accuracy when the HDOP is 4 and the ranging accuracy is 2.

The required positioning accuracy can be configured in such a manner that the required positioning accuracy is 4 or less, 1 or less, or the like when the HDOP is used, and the required positioning accuracy is 10 m or less, 5 m or less, or the like when the positioning accuracy in the horizontal direction is used. Further, besides them, the number of the used GPS satellites, a received strength of a GPS radio wave, and the like in the receiver may be used.

Further, as a positioning technique, not only the above-described technique of the GPS but also the technique etc. of the OTDOA (Observed Time Difference Of Arrival) are thinkable. In the case of the technique of the OTDOA, the required positioning accuracy is estimated based on the number of the radio base stations that the radio terminal detects (the radio wave having a strength equal to higher than a predetermined value arrives), the locations of the above radio base stations, the received electric field strength of the radio wave that arrives from each radio base station, a signal-to-noise ratio, and the like. Additionally, instead that the radio terminal calculates the positioning accuracy whenever performing the positioning, the positioning accuracy at an arbitrary spot within the area may be previously obtained using the analysis technique such as a ray-tracing method and may be previously stored in the radio terminal.

Figure 2:
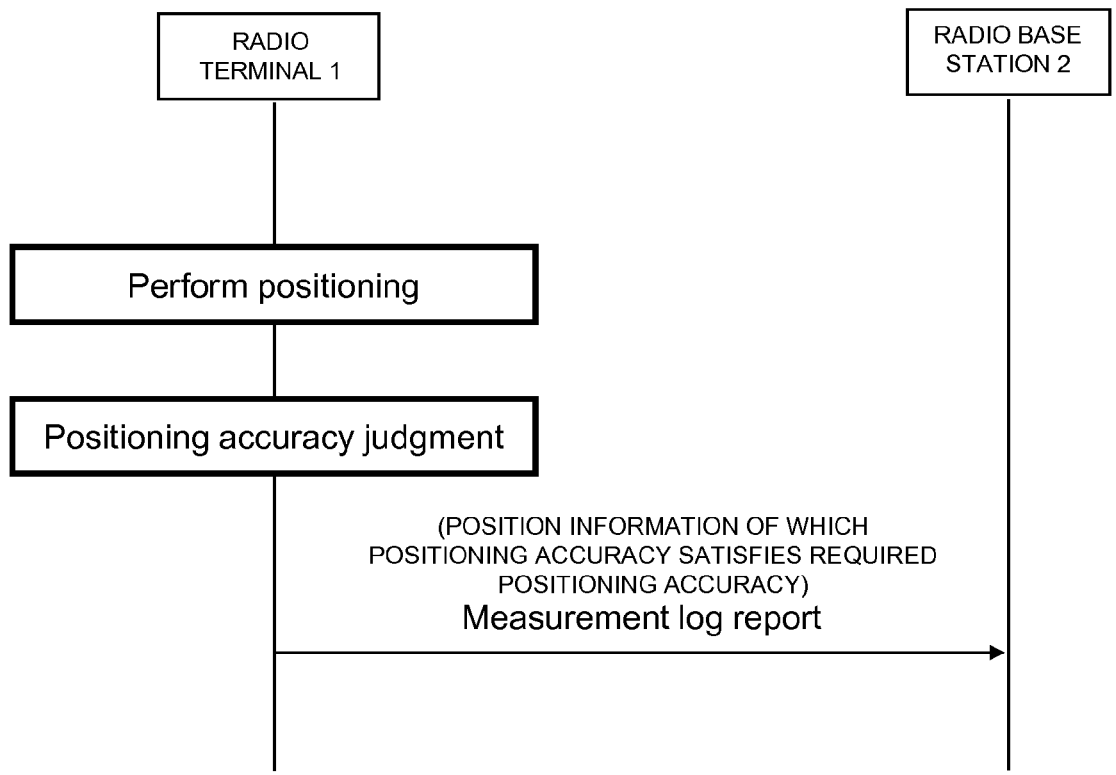
FIG. 2 is a sequence diagram of the radio communication system in this exemplary embodiment.

The radio terminal 1 performs the positioning and calculates the positioning accuracy as shown in FIG. 2 (Perform positioning). And, the radio terminal 1 judges whether or not the above positioning accuracy satisfies the required positioning accuracy (Positioning accuracy judgment), and controls the measurement and/or the reporting of the log(measurement log) of the measurement result by the radio terminal 1 (Measurement log report). While an example of reporting the measured location information as the measurement log is shown in FIG. 2, the reporting related to information other than the location information (for example, the radio characteristics) may be controlled.

Additionally, a mode in which the required positioning accuracy (Positioning accuracy requirement) is notified from the radio base station may be used.

Figure 3:
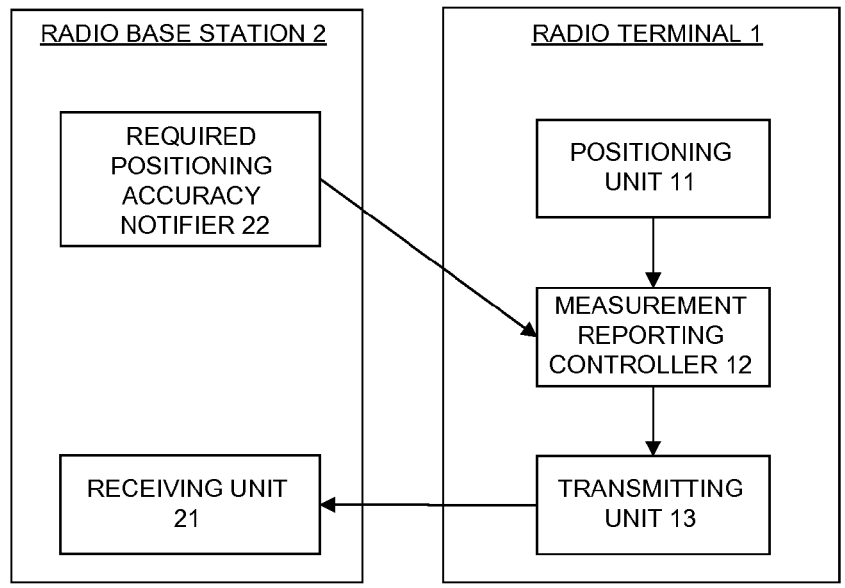
FIG. 3 is a schematic view of the radio communication system in another exemplary embodiment.

FIG. 3 is a schematic view of the mode in which the required positioning accuracy (Positioning accuracy requirement) is notified from the radio base station. As shown in FIG. 3, the radio base station 2 includes a required positioning accuracy notifier 22 that notifies the required positioning accuracy to the radio terminal 1. The radio terminal 1 receives the required positioning accuracy notified from the radio base station 2, and the measurement reporting controller 12 maintains it.

Figure 4:
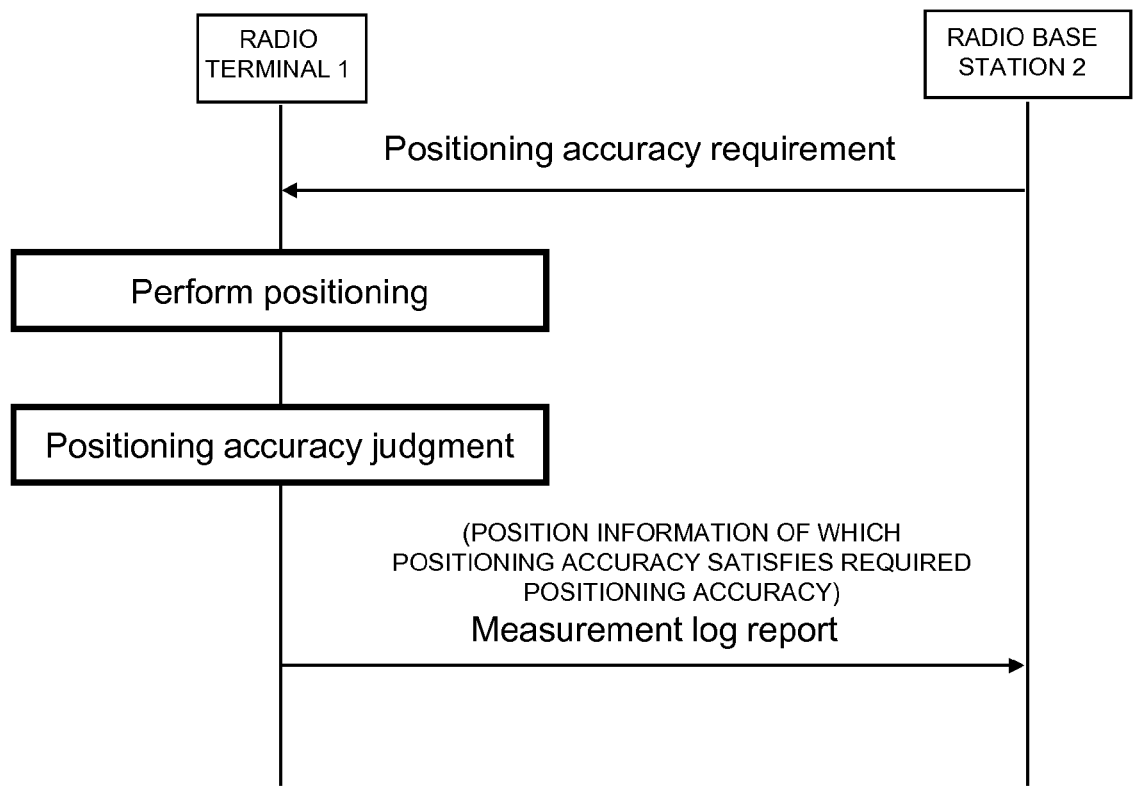
FIG. 4 is a sequence diagram of the radio communication system in another exemplary embodiment.

And, as shown in FIG. 4, the required positioning accuracy (Positioning accuracy requirement) is notified from the radio base station 2, and the radio terminal 1 maintains this notified required positioning accuracy. The radio terminal 1 performs the positioning and calculates the positioning accuracy (Perform positioning). And, the radio terminal 1 judges whether or not the above positioning accuracy satisfies the required positioning accuracy (Positioning accuracy judgment), and controls the measurement and/or the reporting of the log (measurement log) of the measurement result by the radio terminal 1 (Measurement log report). While an example of reporting the measured location information as the measurement log is shown in FIG. 4, the reporting related to information other than the location information (for example, the radio characteristics) may be controlled.

Now, as a way to control the reporting to the radio network, there exist the following examples.

The radio terminal transmits information including at least the location (for example, only the location or the location and radio characteristics) to the radio base station when the above positioning accuracy satisfies the required positioning accuracy, and does not transmit it when the above positioning accuracy does not satisfy.

The report interval of the measurement log is made short when the above positioning accuracy satisfies the required positioning accuracy, and the report interval is made long when it does not satisfy the required positioning accuracy. As an example of the method of changing the report interval, the method of previously configuring the maximum value, the minimum value, and the changing interval of the report interval, and changing the report interval for each changing interval within a range between the minimum value and the maximum value, the method of previously configuring the report interval that is applied when the above positioning accuracy satisfies the required positioning accuracy, and the report interval that is applied when it does not satisfy the required positioning accuracy, separately, the method of changing the report interval when the above positioning accuracy has satisfied the required positioning accuracy (or when it has not satisfied the required positioning accuracy) at predetermined number of times or more for a predetermined time, and the like are thinkable.

Further, as a way to control the measurement by the radio terminal, there exist the following examples.

The radio terminal measures the additional information such as the radio characteristics when the above positioning accuracy satisfies the required positioning accuracy, and does not measure the additional information when the above positioning accuracy does not satisfy.

The measurement interval is made short when the above positioning accuracy satisfies the required positioning accuracy, and the measurement interval is made long when it does not satisfy the required positioning accuracy. As an example of the method of changing the measurement interval, the method of previously configuring the maximum value, the minimum value, and the changing interval of the measurement interval, and changing the measurement interval for each changing interval within a range between the minimum value and the maximum value, the method of previously configuring the measurement interval that is applied when the above positioning accuracy satisfies the required positioning accuracy, and the measurement interval that is applied when it does not satisfy the required positioning accuracy, separately, the method of changing the measurement interval when the above positioning accuracy has satisfied the required positioning accuracy (or when it has not satisfied the required positioning accuracy) at predetermined number of times or more for a predetermined time, and the like are thinkable.

In addition, some configuration methods on the required positioning accuracy are thinkable.

The required positioning accuracy is configured according to a reporting status from the radio terminal (the number of the reports and a distribution of the measured locations). For example, the required positioning accuracy having a relatively high value is configured at first, and the required positioning accuracy is gradually lowered when a sufficient number of the reports are not collected from the radio terminal (or when the measurement locations concentrate on one part of the region).

The required positioning accuracy is configured according to locations (for example, an area in which important customers are present and an area other than it) and geometric attributes (for example, the installation location of the radio base station is an urban area or a suburban area) based on digital map data. For example, the positioning accuracy is inclined to decline due to an influence by high buildings in the urban area, whereby a relative lower value is configured for the required positioning accuracy in the urban area than for the required positioning accuracy in the suburban area.

The required positioning accuracy is configured according to classification of the additional information that the radio terminal is instructed to report, together with the location information. For example, the required positioning accuracy is made high when the radio terminal is instructed to report the received quality of the downlink pilot signals of the serving cell, and the required positioning accuracy is made low when the radio terminal is instructed to report IDs of the neighboring cells.

The required positioning accuracy is configured according to a capability and a situation of the radio terminal. For example, the required positioning accuracy having a relative low value is configured for the radio terminal that is moving in a high velocity, and the required positioning accuracy having a relative high value is configured for the radio terminal that is stationary or is moving in a low velocity. Further, the required positioning accuracy having a relatively higher value is configured for the radio terminal having the GPS than for the radio terminal having only the OTDOA.

Additionally, as a target of the measurement (or detection) by the radio terminal, there exist the radio characteristics such as the received quality of the downlink pilot signals, the broadcast channel reception error (Broadcast Channel Failure), the paging channel reception error (Paging Channel Failure), the received quality of the serving cell becoming worse than a predetermined threshold (Serving Cell becomes worse than threshold), the failure of the random access (Random access (RA) failure), and the radio link disconnection (Radio Link Failure: RLF). Further, with the case of the broadcast channel reception error (Broadcast Channel Failure), the paging channel reception error (Paging Channel Failure), the received quality of the serving cell becoming worse than a predetermined threshold (Serving Cell becomes worse than threshold), the failure of the random access (RA failure), and the radio link disconnection (RLF), it is also thinkable to acquire the radio characteristics (for example, the RSRP, the RSRQ, the CPICH RSCP, and the CPICH Ec/No) of its own cell (Serving cell) and/or the neighboring cells (Neighboring cell (s)). In addition, it is also thinkable to log the information of the location in which the above measurement (or detection) has been performed for all items (or one part thereof) that the radio terminal measures (or detects), the accuracy (positioning accuracy) related to the measurement of the above location, and the information of the time together. Additionally, this is only example, and the application target of the present invention is not limited hereto.

Further, as the trigger of the radio terminal's performing the reporting of the measurement log, there exist an absolute time (Absolute time based), a request from the radio network (for example, the radio base station) (On demand), periodical expiration of the timer (Periodical timer based), a terminal memory usage amount (an amount of the logs) (UE memory usage based), the location of the terminal (Location based), a combination of the above-mentioned items (Combined triggers), and the like; however, the trigger is not limited hereto.

Additionally, in the following, an operation related to the acquisition or detection of the information and an operation in accordance therewith are described (defined) together as "a measurement" except for the case of particularly performing the explanation in details. Further, the measurement information, being information that the radio terminal acquires or detects by use of the above broadly sensed "measurement" and stores, is defined together as "a measurement log".

Further, the measurement to be included in the above broadly sensed "measurement", which targets the location and/or the positioning accuracy, is described as "the positioning".

This makes it possible to collect the information that the radio network side requires while alleviating a load on the terminal caused by the measurement and/or the reporting, and/or deleting the reporting of the information with a low necessity.

Specific exemplary embodiments will be explained below.

First Exemplary Embodiment

The first exemplary embodiment will be explained. The case of supposing a system of the 3GPP LTE (Long Term Evolution) will be explained in the first exemplary embodiment.

Figure 5:
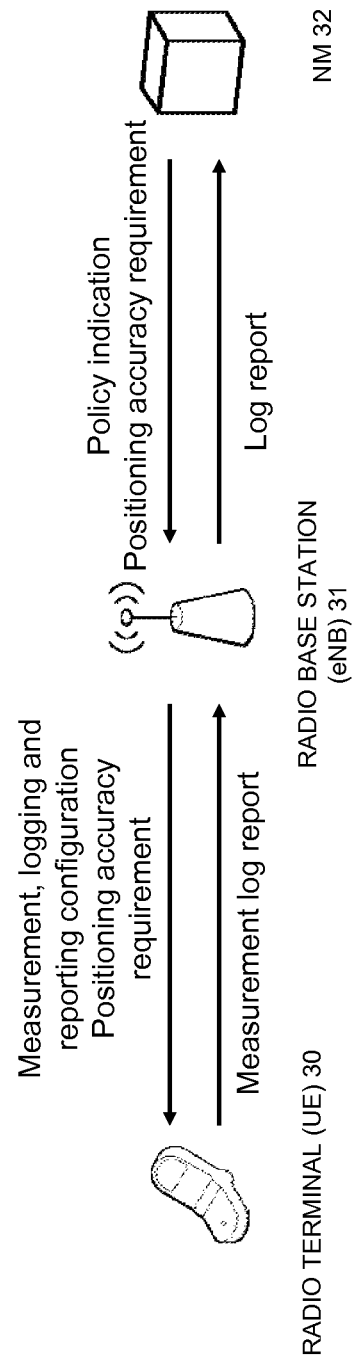
FIG. 5 is a constitution view of the radio communication system in a first exemplary embodiment.

FIG. 5 is a constitution view of the radio communication system in the first exemplary embodiment.

An NM (Network Manager) 32 notifies a policy of the measurement, the logging of the measurement result, and the reporting of the above logging by the radio terminal (UE) 30 to a radio base station (eNB) 31 (Policy indication). The NM 32 notifies the above-described required positioning accuracy as well (Positioning accuracy requirement) in addition to this notification information (or as one part) to the radio base station (eNB) 31. As a target of this policy, for example, the minimization of the drive test (MDT: Minimization of Drive Test. Or it is also called a substitute for the drive test (Drive Test Substitution)) and the like are thinkable.

The radio base station (eNB) 31 notifies the measurement method, the logging method, and the reporting method (Measurement, logging and reporting configuration) and the required positioning accuracy (Positioning accuracy requirement) to the radio terminal (UE) 30 based on the policy of the measurement, the logging of the measurement result, and the reporting of the above logging (Policy indication) coming from the NM (Network Manager) 32.

The radio terminal (UE) 30 reports the log of the measurement result (measurement log) to the radio base station (eNB) 31 (Measurement status report).

The radio base station (eNB) 31 reports the measurement log reported from the radio terminal (UE) 30 to the upper NM 32 (Log report).

Figure 6:
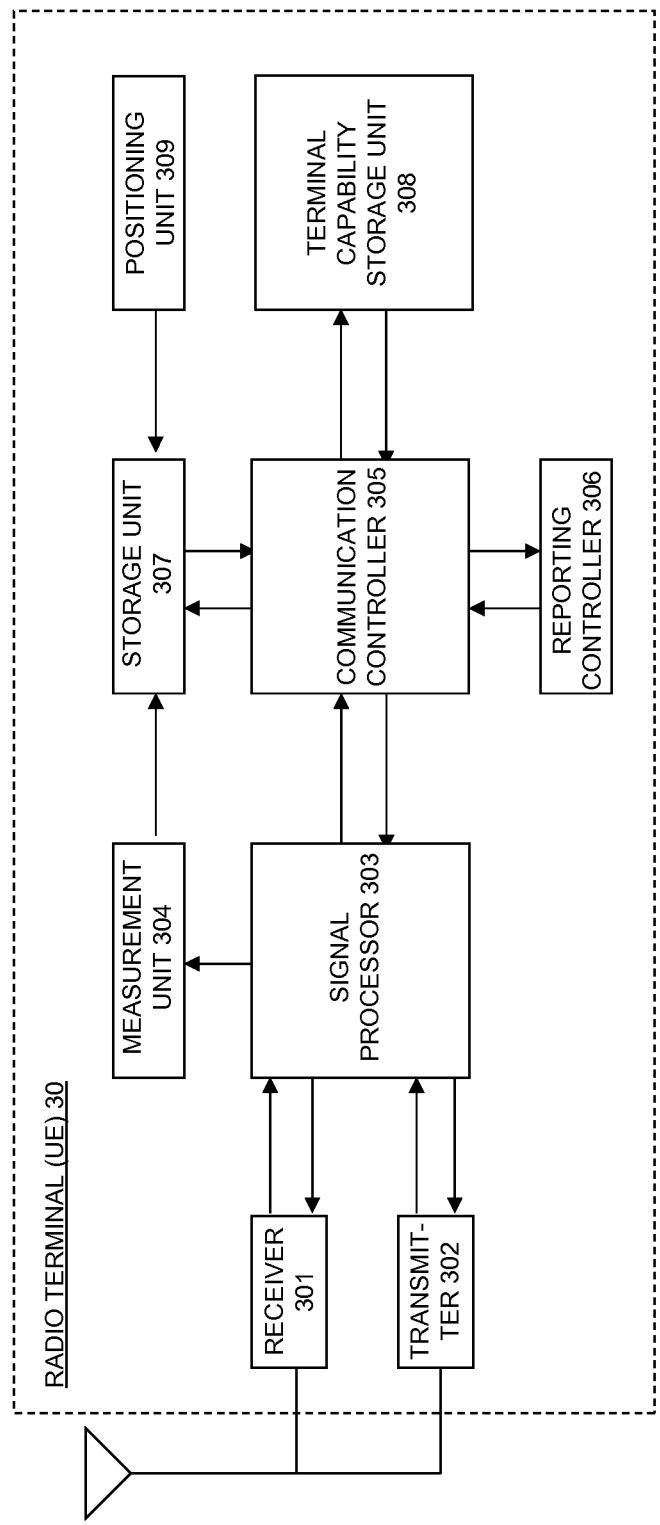
FIG. 6 is a block diagram of a radio terminal (UE) 30.

Next, a constitution of the radio terminal (UE) 30 will be explained. FIG. 6 is a block diagram of the radio terminal (UE) 30.

A receiver 301 or a transmitter 302 performs the transmission/reception of signals to/from the radio base station 31.

A signal processor 303 performs generation of transmission signals/demodulation of reception signals.

A measurement unit 304 measures or detects the target indicated by the radio base station for each decided interval or when the condition, being the trigger, is satisfied. Additionally, it is assumed that a positioning unit 309 executes the measurement of the location (positioning).

The positioning unit 309 performs the measurement of the location of the radio terminal and the calculation of the positioning accuracy. Herein, the method of the positioning includes not only the detection by the GPS and the OTDOA but also the reading-out of the information of the area (Cell, TA (Tracking Area) and the like) in which the radio terminal exists, the acquisition of the information as to whether the target exists outdoors or indoors, wireless LAN (Local Area Network) positioning, and the like. Additionally, only the positioning accuracy may be calculated when only the positioning accuracy can be calculated without the location measured.

A communication controller 305 gives an instruction for generating the transmission signals and recovering the information, and the like to the signal processor 303.

A reporting controller 306 controls the transmission of the measurement log to the radio base station based on whether or not the positioning accuracy calculated by the positioning unit 309 satisfies the required positioning accuracy notified from the radio base station 31.

A storage unit 307 stores the information measured or detected by the measurement unit 304 and the positioning unit 309, and the information is read out responding to a necessity.

A terminal capability storage unit 308 is a part for storing the capability etc. related to the measurement and the reporting by the above terminal, and the capability etc. is appropriately read out responding to a necessity. For example, the terminal capability storage unit 308 stores the information etc. as to whether or not to have the positioning capability such as the GPS (Global Positioning System) and the OTDOA. The required positioning accuracy (Positioning accuracy requirement) notified from the radio base station 31 may be maintained in the terminal capability storage unit 308 in some cases, or may be maintained in the storage unit 307 or the reporting controller 306 in some cases.

Figure 7:
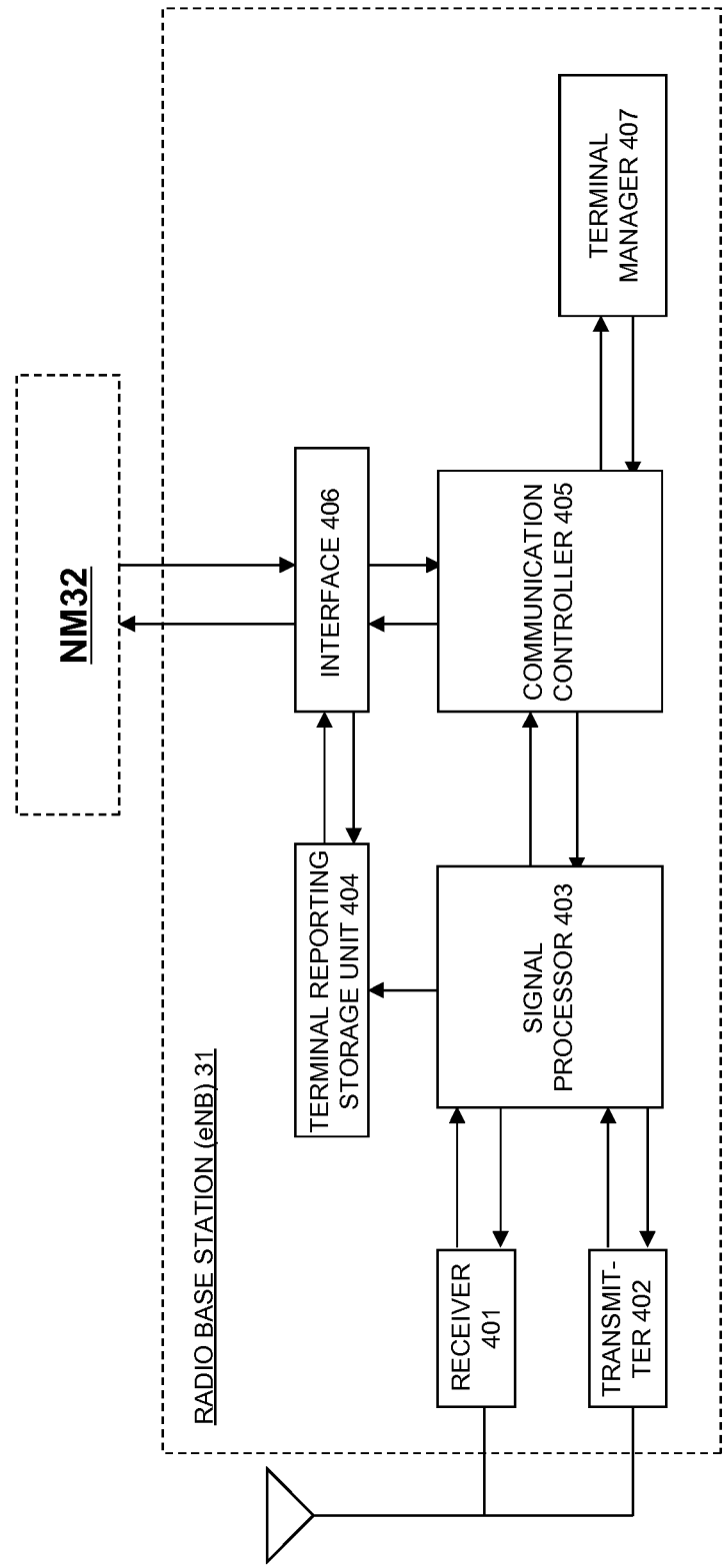
FIG. 7 is a block diagram of a radio base station (eNB) 31.

Continuously, a constitution of the radio base station (eNB) 31 will be explained. FIG. 7 is a block diagram of the radio base station (eNB) 31.

A receiver 401 or a transmitter 402 performs the transmission/reception of signals to/from the radio terminal 30.

A signal processor 403 performs generation of transmission signals/demodulation of reception signals.

A terminal reporting storage unit 404 is a part for storing the measurement log etc. reported from the radio terminal 30, and the stored measurement log etc. is reported to the upper station NM 32 via an interface 406 responding a necessity.

A communication controller 405 gives an instruction for generating the transmission signals and recovering the information, and the like to the signal processor.

The interface 406 performs the transmission/reception of the information to/from the upper station NM 32.

A terminal manager 407 separately manages respective situations of a plurality of the radio terminals.

Figure 8:
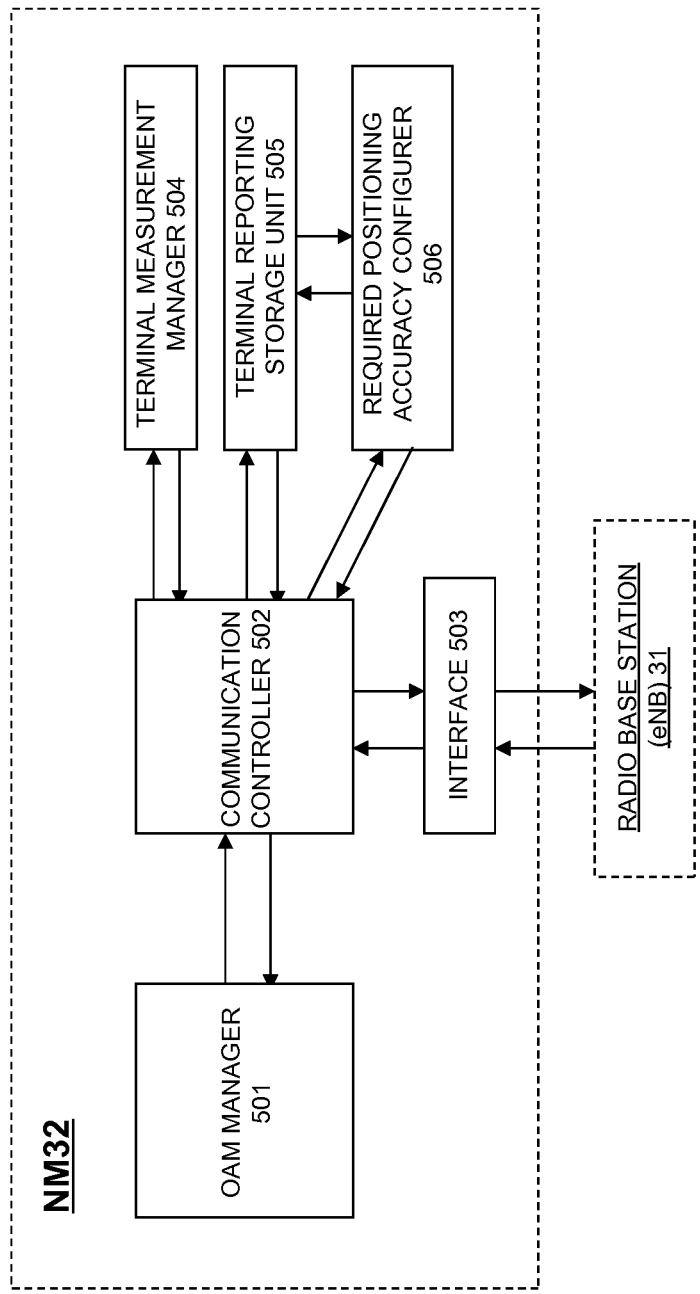
FIG. 8 is a block diagram of an NM 32.

Continuously, a constitution of the NM 32 will be explained. FIG. 8 is a block diagram of the NM 32.

An OAM manager 501 performs an operation/administration/maintenance of an entirety of the radio network.

A communication controller 502 performs a control of transmitting/receiving the information to/from other radio network nodes, for example, the radio base station 31 via an interface 503.

A terminal measurement manager 504 decides the information that needs to be collected, decides a policy for the above collection, and notifies it to the radio base station 31 via the interface 503. The policy herein includes a policy of the measurement by the radio terminal, the log of the measurement result, and the reporting of the above log, for example, the information to be measured, the measurement interval, the report interval, and the information such as the condition, being the trigger of the measurement and the reporting.

A terminal reporting storage unit 505 stores the measurement log etc. reported from the radio terminal, and the above measurement log is read out according to a necessity. The read-out measurement log etc. is used for the optimization of the radio network and the like.

A required positioning accuracy configurer 506 decides the required positioning accuracy and notifies it to the radio base station 31 via the interface 503.

Next, an operation of the radio system constituted as described above will be explained.

Figure 9:
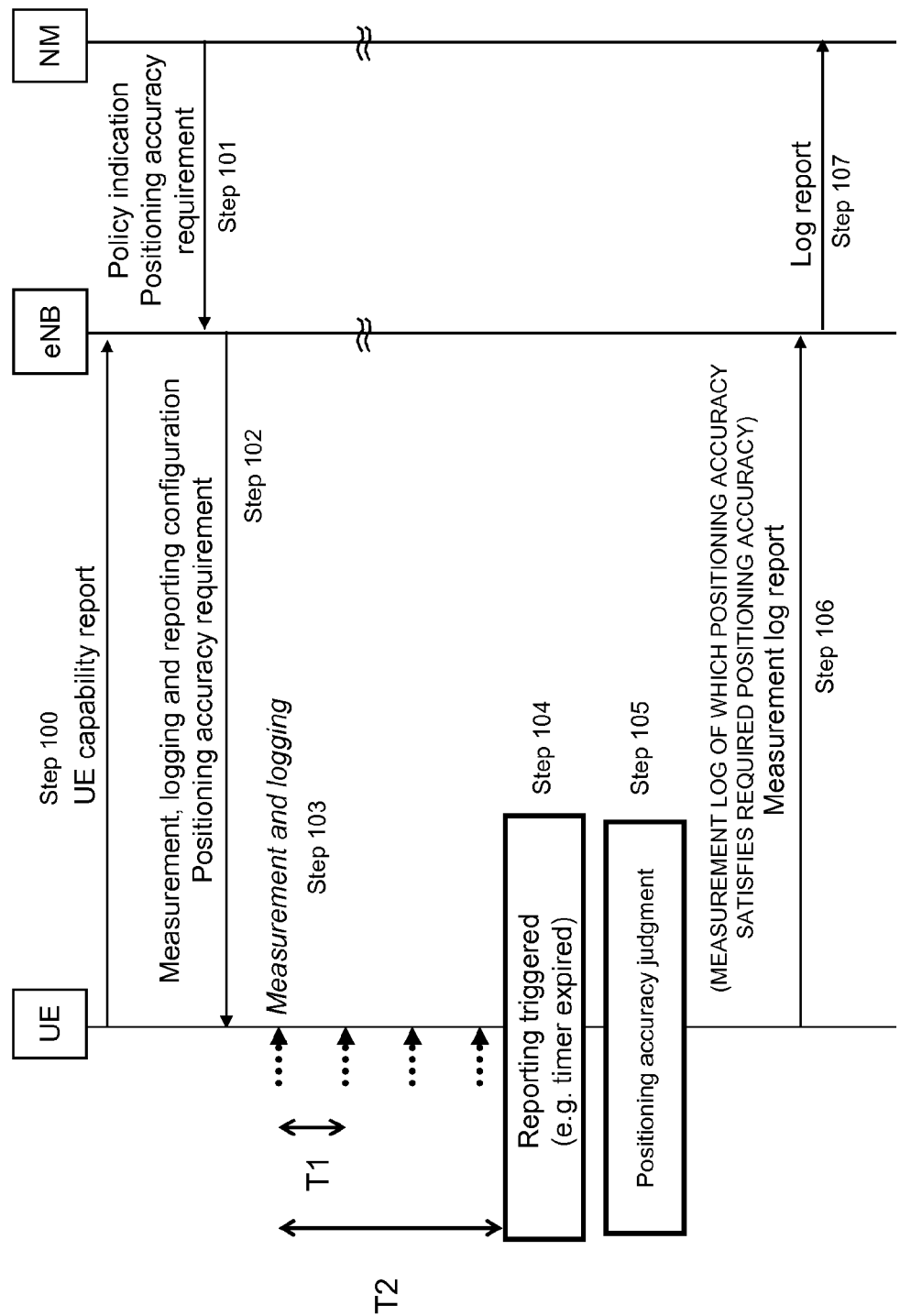
FIG. 9 is a sequence diagram for explaining a specific operation of the first exemplary embodiment.

FIG. 9 is a sequence diagram for explaining a specific operation of the first exemplary embodiment.

Additionally, in the following explanation, the case in which the radio base station (eNB) 31 notifies the required positioning accuracy to the radio terminal (UE) 30, and the radio terminal (UE) 30 reports the measurement log satisfying the notified required positioning accuracy, out of the measurement logs that the radio terminal (UE) 30 maintains, will be explained. Further, in this example, it is assumed that the measurement/the reporting by the radio terminal (UE) 30 is periodically performed based on the timer value to be notified from the radio base station (eNB) 31.

At first, the radio terminal (UE) 30 notifies the function the radio terminal itself supports to the radio base station (eNB) 31 (UE capability report) (Step 100). For example, the radio terminal (UE) 30 notifies the positioning function (for example, the GPS and the OTDOA) the radio terminal itself has to the radio base station (eNB) 31.

The NM 32 notifies the measurement policy (Measurement policy) to the radio base station (eNB) 31 (Policy indication). Further, in this exemplary embodiment, the NM 32 notifies the required positioning accuracy as well (Positioning accuracy requirement) as one part of the above-mentioned measurement policy or as a separate message to the radio base station (eNB) 31 (Policy indication) (Step 101).

The radio base station (eNB) 31 sends a timer value (T1) of the measurement interval of the radio terminal (UE) 30 and a timer value (T2) of the report interval at which the measurement log is reported based on the measurement policy (Measurement policy) (Measurement, reporting and logging configuration). Further, the radio base station (eNB) 31 sends to the radio terminal (UE) 30 the required positioning accuracy (Positioning accuracy requirement) the radio terminal (UE) 30 uses (Step 102). The notification of the required positioning accuracy may be performed at a timing identical to the timing at which the timer value (T1) of the measurement interval and the timer value (T2) of the report interval are notified (or as an identical message) in some cases, or may be performed at another timing (or as another message) in some cases.

The radio terminal (UE) 30 performs the measurement of the radio characteristics and the positioning (the measurement of the location and the calculation of the positioning accuracy) at the measurement interval based on the notified timer value and logs the measurement result as one bundle of the measurement logs according to the instructed measurement method (Measurement and logging) (Step 103).

Continuously, the radio terminal (UE) 30 judges, for each recorded measurement log, whether the positioning accuracy of the above measurement log satisfies the required positioning accuracy (Positioning accuracy judgment) (Step 105) when the timer of the report interval expires (Step 104). With regard to the measurement logs of which the positioning accuracy satisfies the required positioning accuracy, the radio terminal (UE) 30 reports them to the radio base station (eNB) 31 via the radio network (Measurement log report) (Step 106). And, the radio base station (eNB) 31 transmits the received measurement logs to the NM 32 (Log report) (Step 107). On the other hand, the radio terminal (UE) 30 does not perform the reporting process of the measurement log for the measurement logs of which the positioning accuracy does not satisfy the required positioning accuracy.

This makes it possible to cause the radio terminal to perform the reporting without (excessively) increasing a load on the radio terminal.

Next, an operation of the radio terminal (UE) 30 will be explained.

Figure 10:
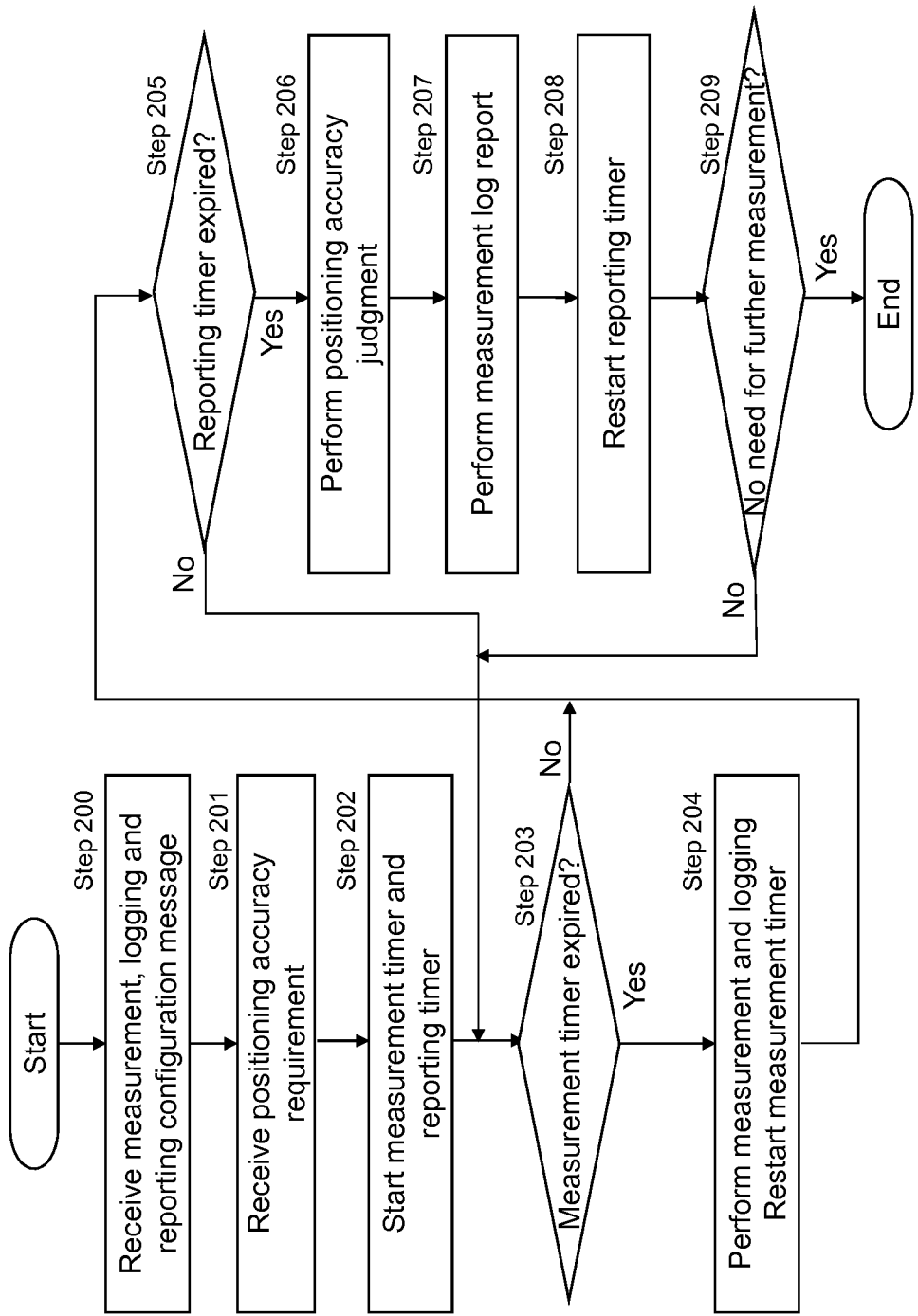
FIG. 10 is an operational flowchart of the radio terminal (UE) 30.

FIG. 10 is an operational flowchart of the radio terminal (UE) 30.

At first, the radio terminal (UE) 30 receives the configuration of the measurement method and the reporting method (Measurement, logging and reporting configuration) (Step 200). Further, the radio terminal (UE) 30 receives the required positioning accuracy (Positioning accuracy requirement) (Step 201).

The radio terminal (UE) 30 starts the measurement timer and the reporting timer using the notified measurement timer value and reporting timer value (Start measurement timer and reporting timer) (Step 202).

When the measurement timer has expired (Measurement timer expired?) (Step 203), the radio terminal (UE) 30 performs the measurement of the radio characteristics and the positioning (the measurement of the location and the calculation of the positioning accuracy) and logs its result as the measurement log (Perform measurement and logging). And, the radio terminal (UE) 301 restarts the measurement timer (Restart measurement timer) (Step 204).

Continuously, when the reporting timer has expired (Reporting timer expired?) (Step 205), the radio terminal (UE) 30 judges, for each recorded measurement log, whether or not the positioning accuracy of the above measurement log satisfies the required positioning accuracy (Perform positioning accuracy judgment) (Step 206).

The radio terminal (UE) 30 reports the measurement logs of which the positioning accuracy satisfies the required positioning accuracy (Perform measurement log report) (Step 207), and does not report the measurement logs of which the positioning accuracy does not satisfy the required positioning accuracy. Additionally, the measurement logs of which the reporting has been completed, and the measurement logs of which the positioning accuracy does not satisfy the required positioning accuracy may be deleted from a record region (memory) of the radio terminal.

Continuously, the radio terminal (UE) 30 restarts the reporting timer (Restart reporting timer) (Step 208). And, the radio terminal (UE) 30 proceeds to the Step 203 when a process of the furthermore measurement is required, and finishes the process when the furthermore measurement is not required (Step 209).

Additionally, while the case in which the radio terminal (UE) 30 previously recorded all the results of the measurement of the radio characteristics and the positioning (the measurement of the location and the calculation of the positioning accuracy) as the measurement log, and selected and reported only the measurement log satisfying the required positioning accuracy at a time point when the reporting was performed was explained in the above-described explanation, the selection and reporting are not limited hereto.

For example, the radio terminal (UE) 30 may record only the measurement logs satisfying the required positioning accuracy when recording the results of the measurement of the radio characteristics and the positioning (the measurement of the location and the calculation of the positioning accuracy). In this case, all the recorded measurement logs result in satisfying the required positioning accuracy, whereby any measurement log may be regarded as a reporting target.

Further, when the information regarded as a measurement target by the radio terminal exists in a plural number, the radio terminal may choice the information to be reported, according to whether or not the positioning accuracy satisfies the required positioning accuracy. As one example, think about the case of instructing the radio terminal to measure the received quality of the downlink pilot signals and the number of times the application is used. At this time, the radio terminal reports both of the received quality of the downlink pilot signals and the number of times the application is used together with the positioning result when the positioning accuracy satisfies the required positioning accuracy. On the other hand, the radio terminal is instructed to reports only the number of times the application is used when the positioning accuracy does not satisfy the required positioning accuracy. This makes it possible to collect only the information having a low relationship to the location when the positioning accuracy is low.

In addition, the radio terminal (UE) 30 may change the report interval instead of judging whether or not to report the measurement log according to whether or not the positioning accuracy satisfies the required positioning accuracy (or in addition hereto).

For example, the method may be used of preparing at least two reporting timer values each having a different value or more, configuring a shorter timer value when the above positioning accuracy satisfies the required positioning accuracy, and configuring a longer timer value when it does not satisfy the required positioning accuracy.

Further, the method may be used of previously configuring the maximum value, the minimum value, and the changing interval of the reporting timer value, and changing the reporting timer value for each changing interval within a range between the minimum value and the maximum value according to whether or not the above positioning accuracy satisfies the required positioning accuracy.

Further, the method may be used of previously configuring the reporting timer value that is configured when the positioning accuracy satisfies the required positioning accuracy, and the reporting timer value that is configured when it does not satisfy the required positioning accuracy, separately.

Further, the method may be used of changing the report interval when the positioning accuracy has satisfied the required positioning accuracy predetermined number of times or more (when it has not satisfied) for a predetermined time.

In addition, while an example in which the reporting of the measurement log was performed periodically was explained in the above-described explanation, the reporting is not limited hereto, and for example, the method may be used in which the radio base station transmits the condition, being the trigger of reporting the measurement log, and the radio terminal judges whether or not the positioning accuracy satisfies the required positioning accuracy when the received condition has been satisfied, and reports only the measurement logs satisfying the required positioning accuracy.

Further, while the case in which the required positioning accuracy to be notified by the radio base station was a fixed value was explained in the above-described example, the required positioning accuracy to be transmitted by the radio base station may be changed dependent on some conditions.

As an example of changing the required positioning accuracy, the following methods are thinkable.

The required positioning accuracy is changed according to a report situation (the number of the reports and a distribution of the measured locations) from the radio terminal. For example, the required positioning accuracy having a relatively high value is configured in the first place, and the required positioning accuracy is gradually lowered when a sufficient number of the reports are not collected from the radio terminal (or when the measurement locations concentrate on one part of the region).

The required positioning accuracy is configured according to locations (for example, an area in which important customers are present and an area other than it) and geometric attributes (for example, the installation location of the radio base station is a city or a suburb) based on digital map data. For example, the positioning accuracy is inclined to decline due to an influence by high buildings in the city, whereby a relative lower value is configured for the required positioning accuracy in the city than for the required positioning accuracy in the suburb.

The required positioning accuracy is configured according to classification of the additional information that the radio terminal is instructed to report together with the location information. For example, the required positioning accuracy is made high when the radio terminal is instructed to report the received quality of the downlink pilot signals of the serving cell, and the required positioning accuracy is made low when the radio terminal is instructed to report IDs of the neighboring cells.

Additionally, while it was assumed that the required positioning accuracy (Positioning accuracy requirement) was notified from the radio base station to the radio terminal in this exemplary embodiment, the notification thereof is not limited hereto, and a mode in which the radio terminal previously maintains it may be used.

The first exemplary embodiment mentioned above makes it possible to cause the radio terminal to perform the reporting of the measurement log without (excessively) increasing a load on the radio terminal.

Second Exemplary Embodiment

The second exemplary embodiment will be explained.

The second exemplary embodiment controls, according to whether or not the positioning accuracy in the radio terminal satisfies the required positioning accuracy, the conditions related to the measurement in the above radio terminal. Herein, an example will be explained of controlling the measurement interval according to whether or not the positioning accuracy calculated by the radio terminal satisfies the required positioning accuracy notified from the radio base station. Additionally, each of the radio terminal, the radio base station, and the NM assumes a similar constitution, so explanation will be performed with concentrating on different points.

Figure 11:
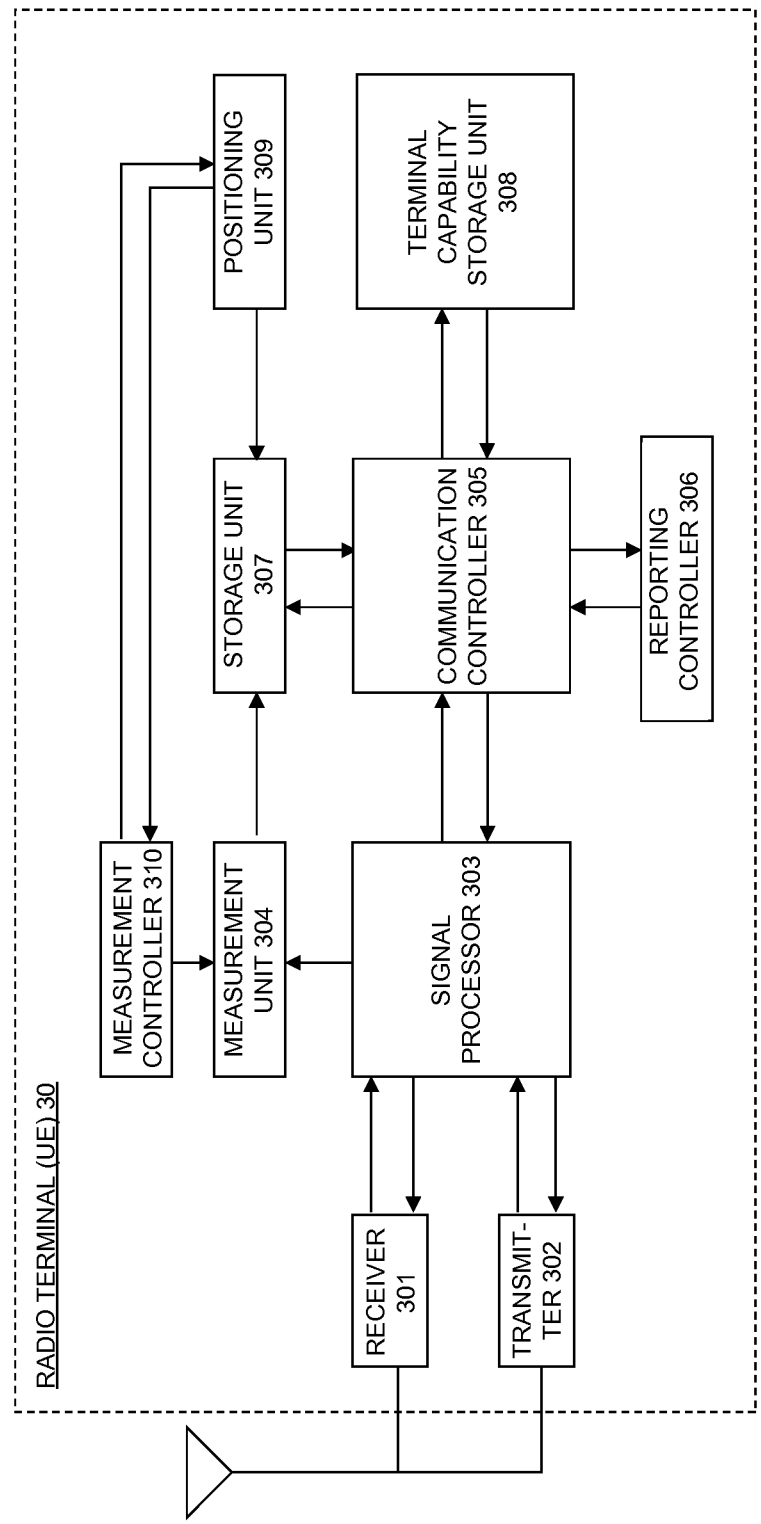
FIG. 11 is a block diagram of the radio terminal (UE) 30.

FIG. 11 is a block diagram of the radio terminal (UE) 30. A point in which this radio terminal differs from the above-described radio terminal (UE) 30 of the first exemplary embodiment is to include a measurement controller 310. The measurement controller 310 controls the measurement intervals of the measurement unit 304 and the positioning unit 309 based on whether or not the positioning accuracy calculated by the positioning unit 309 satisfies the required positioning accuracy notified from the radio base station 31.

Next, an operation of the radio terminal (UE) 30 will be explained.

Figure 12:
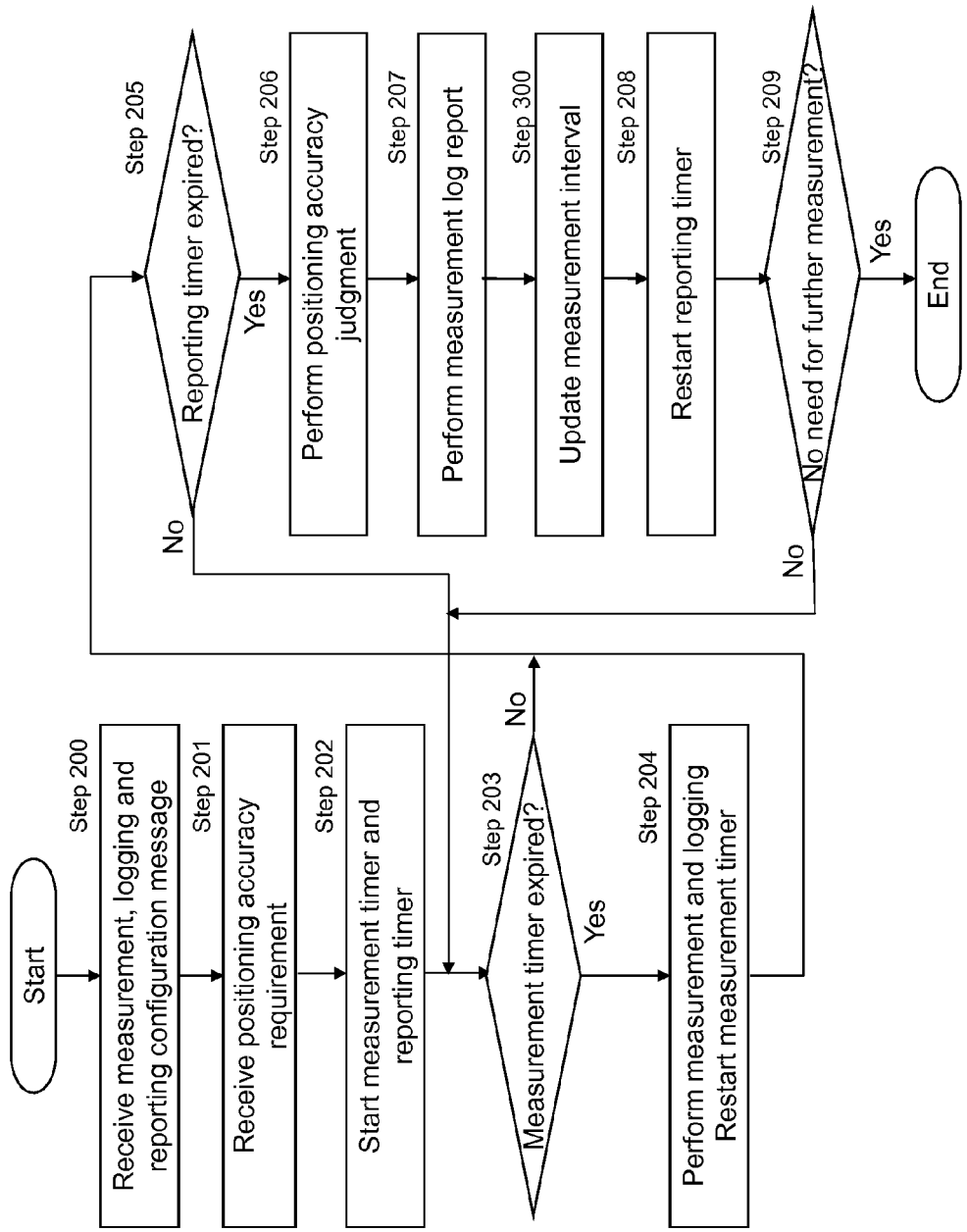
FIG. 12 is an operational flowchart of the radio terminal (UE) 30.

FIG. 12 is an operational flowchart of the radio terminal (UE) 30. A point in which this radio terminal differs from the above-described radio terminal (UE) 30 of the first exemplary embodiment is that the measurement controller 310 executes update of the measurement interval (Update measurement interval) (Step 300) after the radio terminal (UE) 30 reports the measurement logs satisfying the required positioning accuracy (Step 207).

For example, a first measurement timer value and a second measurement timer value having a time longer than that of the first measurement timer value are previously notified to the radio terminal (UE) 30 by an instruction for the measurement and the reporting coming from the radio base station 31 (Measurement, logging and reporting configuration). The radio terminal (UE) 30 judges whether or not the measurement logs not satisfying the required positioning accuracy exist in a predetermined number or more after finishing the reporting of the measurement logs (Perform measurement log report)(Step 207), and makes a changeover to the second measurement timer value when the measurement logs not satisfying the required positioning accuracy exist in a predetermined number or more.

This makes it possible to cause the radio terminal to perform the measurement and the reporting without (excessively) increasing a load on the radio terminal.

Additionally, while the case of updating the measurement interval after reporting the measurement logs satisfying the required positioning accuracy was explained in the above-described explanation, the update of the measurement log is not limited hereto.

For example, the radio terminal may update the measurement interval according to whether or not the positioning accuracy satisfies the required positioning accuracy after executing the measurement of the radio characteristics and the positioning (the measurement of the location and calculation of the positioning accuracy) or after logging the above measurement result (Step 204).

In addition, the method of changing the measurement interval as well is not limited to the above-mentioned method.

For example, the method of previously configuring the maximum value, the minimum value, the changing interval of the measurement timer value, and changing the measurement interval for each changing interval within a range between the minimum value and the maximum value may be used.

Further, the method may be used of changing the measurement interval when the positioning accuracy has satisfied the required positioning accuracy predetermined number of times or more (when the above positioning accuracy has not satisfied) for a predetermined time.

Additionally, while it was assumed that the required positioning accuracy (Positioning accuracy requirement) was notified from the radio base station to the radio terminal in this exemplary embodiment, the notification thereof is not limited hereto, and a mode in which the radio terminal previously maintains it may be used.

Third Exemplary Embodiment

While the measurement interval was controlled based on the positioning accuracy in the above-described second exemplary embodiment, it is also possible to control the execution of the measurement of additional information other than the location (and/or the positioning accuracy), for example, the radio characteristics based on the positioning accuracy. Thereupon, an example of controlling the execution of the measurement of additional information other than the location (and/or the positioning accuracy) based on the positioning accuracy will be explained in the third exemplary embodiment. Additionally, each of the radio terminal, the radio base station, and the NM assumes a similar constitution, so explanation will be performed with concentrating on different points.

The measurement controller 310 of the radio terminal (UE) 30 gives an instruction for the measurement (for example, the measurement of the received quality of the downlink pilot signals) to the measurement unit 304 when the positioning accuracy calculated by the positioning unit 309 satisfies the required positioning accuracy notified from the radio base station, and does not give an instruction when it does not satisfy.

Next, an operation of the radio terminal (UE) 30 will be explained.

Figure 13:
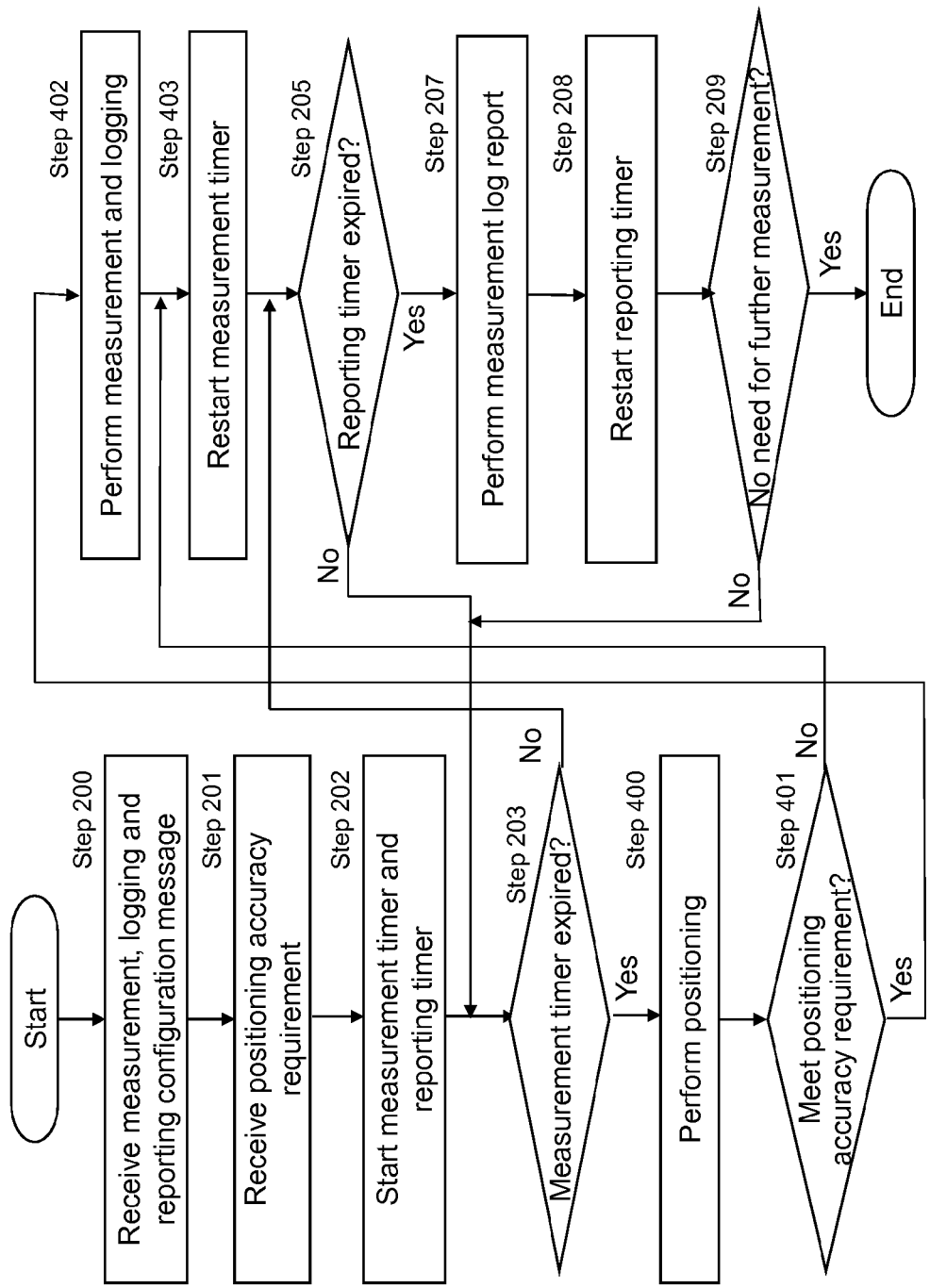
FIG. 13 is an operational flowchart of the radio terminal (UE) 30.

FIG. 13 is an operational flowchart of the radio terminal (UE) 30. Additionally, an operation of the radio terminal (UE) 30 will be explained with concentrating on a point in which the third exemplary embodiment differs from the first exemplary embodiment by exemplifying the case in which the measurement and the reporting are performed periodically.

When the measurement timer has expired (Measurement timer expired?) (Step 203), the radio terminal (UE) 30 executes the positioning (the measurement of the location and the calculation of the positioning accuracy) (Perform positioning) (Step 400). And, the radio terminal (UE) 30 judges whether or not the positioning accuracy satisfies the required positioning accuracy notified from the radio base station (Step 401). The radio terminal (UE) 30 executes the measurement of the radio characteristics such as the received quality of the downlink pilot signals when the positioning accuracy satisfies the required positioning accuracy, and logs it as the measurement log together with the positioning result (Perform measurement and logging) (Step 402). Thereafter, the radio terminal (UE) 30 restarts the measurement timer (Restart measurement timer) (Step 403). On the other hand, the radio terminal (UE) 30 does not measure the radio characteristics such as the received quality of the downlink pilot signals when the positioning accuracy does not satisfy the required positioning accuracy, and restarts the measurement timer (Restart measurement timer) (Step 403).

Additionally, in a case in which the radio terminal (UE) 30 can calculate the positioning accuracy without measuring the location, the radio terminal (UE) 30 may firstly calculate the positioning accuracy and then measure the location only when the positioning accuracy satisfies the required positioning accuracy.

Further, when the information regarded as the measurement target by the radio terminal exists in a plural number, the radio terminal may choice the information to be measured, according to whether or not the positioning accuracy satisfies the required positioning accuracy. As one example, think about the case of causing the radio terminal to measure the received quality of the downlink pilot signals and a remaining battery charge. At this time, the radio terminal measures both of the received quality of the downlink pilot signals and the remaining battery charge when the positioning accuracy satisfies the required positioning accuracy. On the other hand, the radio terminal is instructed to measure only the remaining battery charge when the positioning accuracy does not satisfy the required positioning accuracy. This makes it possible to instruct the radio terminal to measure only the information having a low relationship to the location when the positioning accuracy is low.

Continuously, when the reporting timer has expired (Reporting timer expired?) (Step 205), the radio terminal (UE) 30 reports the logged measurement log(Perform measurement log report) (Step 207), and restarts the reporting timer (Restart reporting timer) (Step 208).

One example of another operation of the radio terminal (UE) 30 will be explained.

Figure 14:
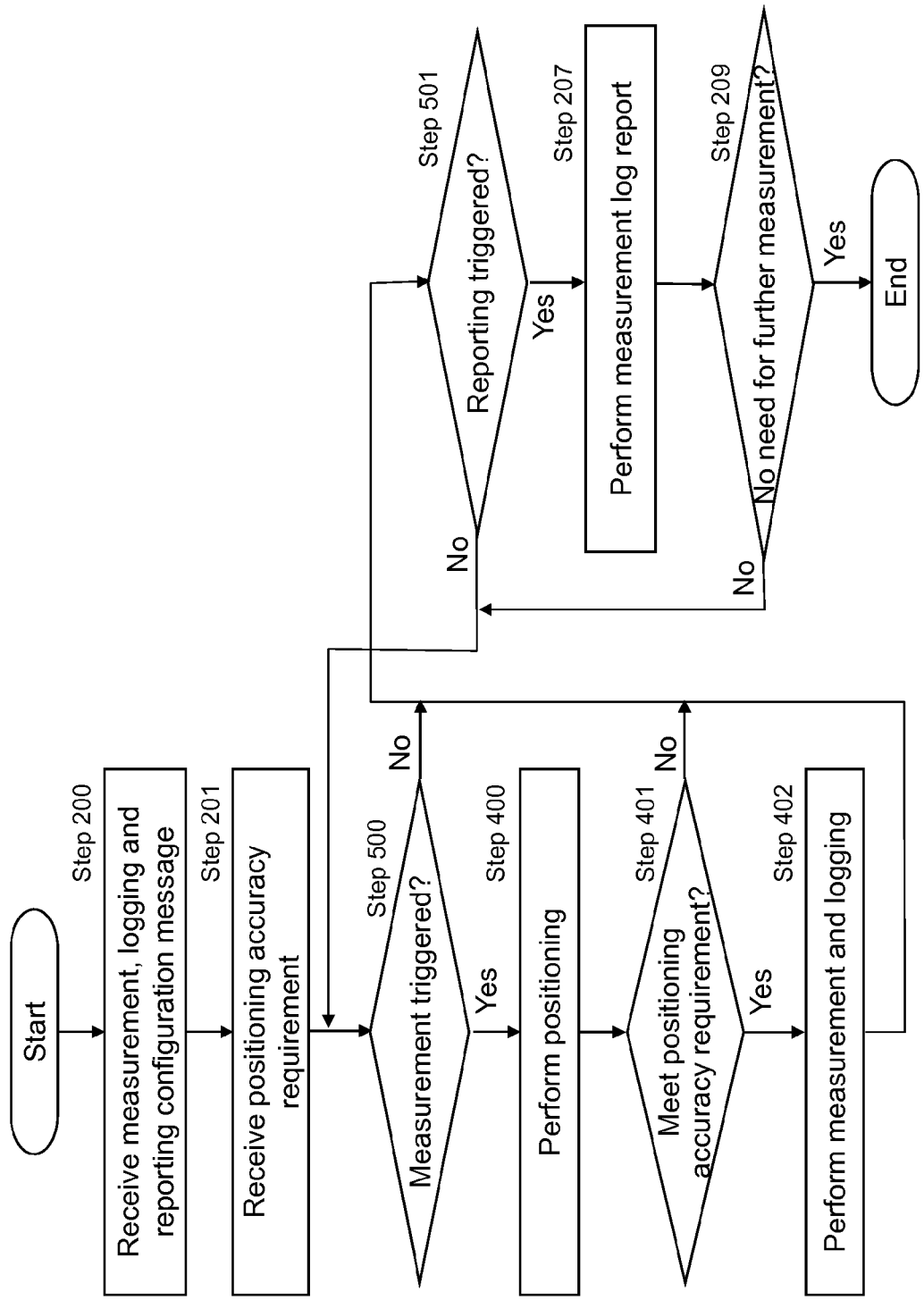
FIG. 14 is an operational flowchart illustrating one example of another operation of the radio terminal (UE) 30.
Figure 15:
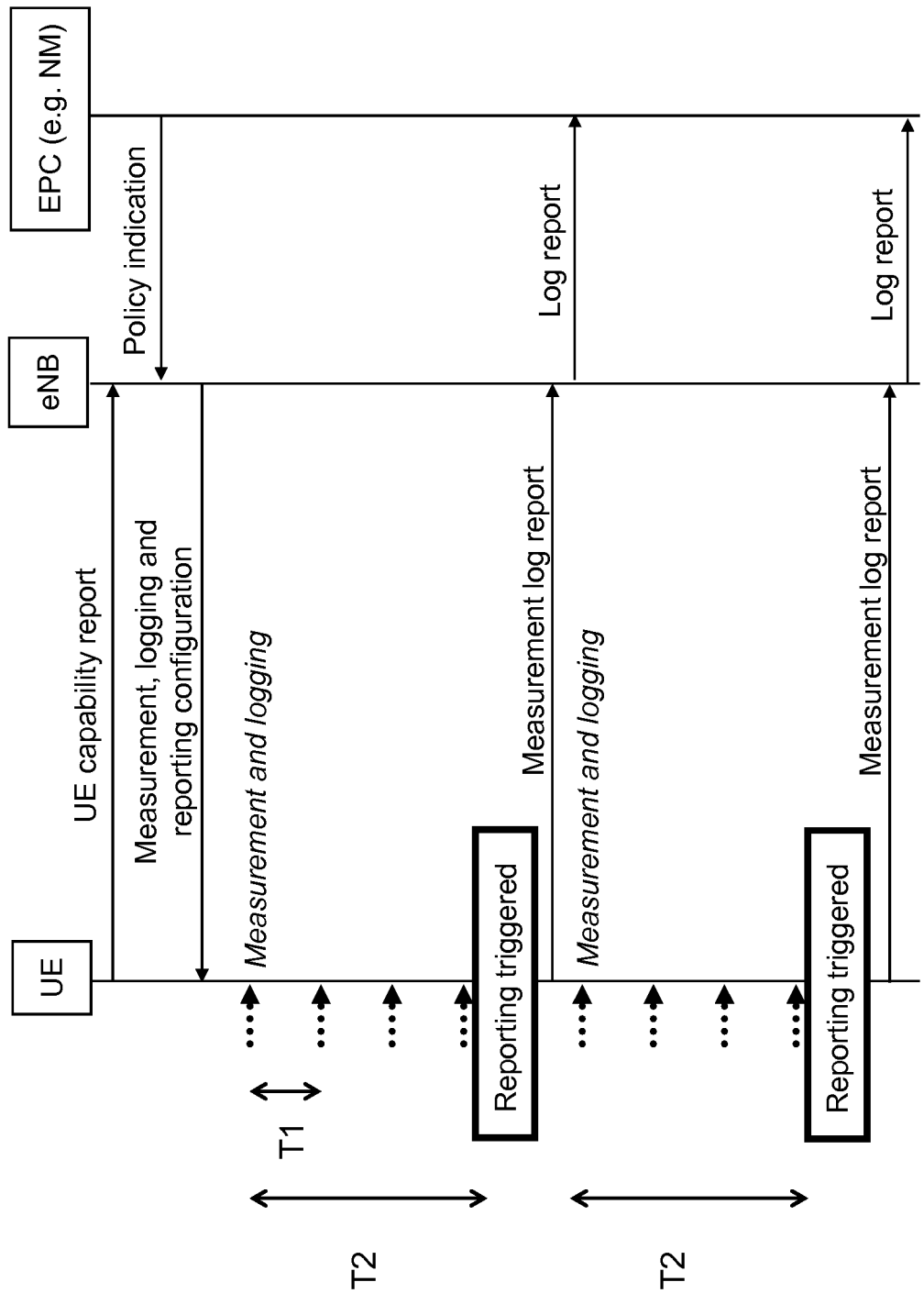
FIG. 15 is a view for explaining the technology related to the present invention.
Figure 16:
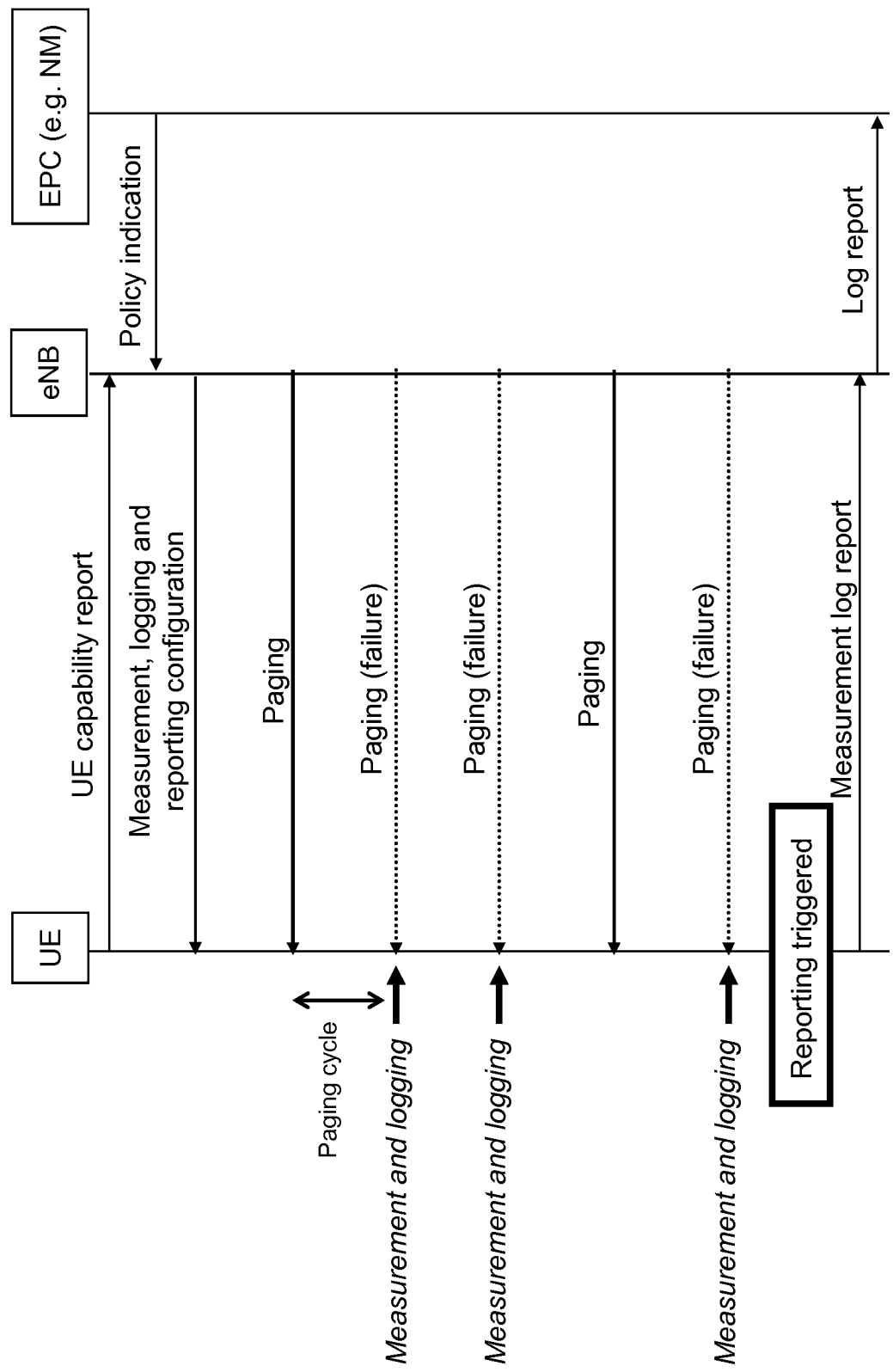
FIG. 16 is a view for explaining the technology related to the present invention.

FIG. 14 is an operational flowchart illustrating one example of another operation of the radio terminal (UE) 30. Additionally, an operation of the radio terminal (UE) 30 will be explained with concentrating on a point in which the case of performing the measurement and the reporting by an event trigger differ from the case of periodically performing the measurement and the reporting (FIG. 13) by exemplifying the former.

The radio terminal (UE) 30 judges whether or not the condition, being the trigger of the measurement, has been satisfied (Step 500), and executes the positioning (the measurement of the location and the calculation of the positioning accuracy) (Perform positioning) (Step 400). As the condition, being the trigger of the measurement, there exist the broadcast channel reception error (Broadcast Channel Failure), the paging channel reception error (Paging Channel Failure), the received quality of the serving cell becoming worse than a predetermined threshold (Serving Cell becomes worse than threshold), the failure of the random access (Random access (RA) failure), the radio link disconnection (Radio Link Failure: RLF), and the like as described above.

Continuously, the radio terminal (UE) 30 judges whether or not the positioning accuracy satisfies the required positioning accuracy notified from the radio base station (Step 401), executes the measurement of the radio characteristics such as the received quality of the downlink pilot signals when the positioning accuracy satisfies the required positioning accuracy, and logs it as the measurement log together with the positioning result (Perform measurement and logging) (Step 402).

Continuously, the radio terminal (UE) 30 judges whether or not the condition, being the trigger of the reporting, has been satisfied (Step 501), and reports the logged measurement logs (Perform measurement log report) (Step 207) when the condition, being the trigger of the reporting, has been satisfied. As the condition, being the trigger of the reporting, there exist the absolute time (Absolute time based), on demand from the radio network (for example, the radio base station) (On demand), the periodical expiration of the timer (Periodical timer based), the terminal memory usage amount (an amount of the logs) (UE memory usage based), the location of the terminal (Location based), a combination of the above-mentioned items (Combined triggers), and the like as mentioned above.

Additionally, while it was assumed that the required positioning accuracy (Positioning accuracy requirement) was notified from the radio base station to the radio terminal in this exemplary embodiment, the notification thereof is not limited hereto, and a mode in which the radio terminal previously maintains it may be used.

Additionally, in all the above-described exemplary embodiments, the policy of the measurement and the reporting was notified from the upper network node (NM) to the radio base station (eNB); however, the notification is not limited hereto. For example, the radio base station (eNB) itself may decide and configure the policy in some cases, or while taking the policy notified from the NM into consideration, the radio base station (eNB) may changes the above policy in some cases.

Further, while an example of the case in which the radio terminal actually performed the measurement and the reporting as a subordinate (in a cell) of the radio base station having notified the configuration of the measurement method and the reporting method was shown in all the above-described exemplary embodiments, the application scope of the present invention is not limited hereto. For example, it is possible for the radio terminal to perform the operation as shown in the above-described examples so long as the above configuration is valid even after moving to the cells of the other radio base stations from the cell of the radio base station having notified the configuration of the measurement method and the reporting method.

Further, while one example of controlling the measurement and the reporting based on the positioning accuracy was described in the above-described exemplary embodiments, the application scope of the present invention is not limited hereto. For example, a direction of the control of the measurement interval, the report interval, and the measurement execution may be reversed. For example, the measurement interval and/or the report interval may be made short instead of making the measurement interval and/or the report interval long when the positioning accuracy has satisfied the required positioning accuracy.

In addition, while the above-described exemplary embodiments basically supposed a system of the 3GPP LTE, the application scope of the present invention is not limited hereto. For example, the present invention is applicable to UMTS (Universal Mobile Telecommunication System) to be represented by WCDMA (Wideband Code Division Multiple Access), WiMAX (Worldwide interoperability for Microwave Access), wireless LAN (Local Area Network) and the like.

Further, while each unit was constituted with hardware in the above-described exemplary embodiments, it may be constituted with a program that causes an information processor (CPU) to execute the processes of the above-described operations.

Above, although the present invention has been particularly described with reference to the preferred embodiments and the examples, it should be readily apparent to those of ordinary skill in the art that the present invention is not always limited to the above-mentioned embodiments and examples, and changes and modifications in the form and details may be made without departing from the spirit and scope of the invention.

Further, the content of the above-mentioned exemplary embodiments can be expressed as follows.

(Supplementary note 1) A radio terminal that performs measurement based on a measurement condition to be indicated by a radio network, and reports a measurement result, comprising:

positioning accuracy calculating means that calculates a positioning accuracy of the radio terminal;

required positioning accuracy maintaining means that maintains a required positioning accuracy related to a condition of the positioning accuracy; and measurement reporting controlling means that compares said required positioning accuracy with said calculated positioning accuracy, and controls execution of at least one of the measurement and the reporting of said measurement result to the radio network by the radio terminal.

(Supplementary note 2) A radio terminal according to Supplementary note 1, wherein said measurement reporting controlling means does not report at least one part of said measurement result to the radio network when said calculated positioning accuracy does not satisfy said required positioning accuracy.

(Supplementary note 3) A radio terminal according to Supplementary note 1 or Supplementary note 2, wherein said measurement reporting controlling means changes an interval of the reporting of said measurement result to the radio network when said calculated positioning accuracy does not satisfy said required positioning accuracy.

(Supplementary note 4) A radio terminal according to Supplementary note 3, wherein said measurement reporting controlling means makes the interval of the reporting of said measurement result to the radio network long when said calculated positioning accuracy does not satisfy said required positioning accuracy.

(Supplementary note 5) A radio terminal according to one of Supplementary note 1 to Supplementary note 4, wherein said measurement reporting controlling means does not measure at least one part of information when said calculated positioning accuracy does not satisfy said required positioning accuracy.

(Supplementary note 6) A radio terminal according to one of Supplementary note 1 to Supplementary note 5, wherein said measurement reporting controlling means changes a measurement interval of the information when said calculated positioning accuracy does not satisfy said required positioning accuracy.

(Supplementary note 7) A radio terminal according to Supplementary note 6, wherein said measurement reporting controlling means makes the measurement interval of the information long when said calculated positioning accuracy does not satisfy said required positioning accuracy.

(Supplementary note 8) A radio terminal according to one of Supplementary note 1 to Supplementary note 7, said radio terminal comprising a GPS (Global Positioning System) as a positioning means and calculating said positioning accuracy using at least one of a geometric arrangement of GPS satellites viewed from the radio terminal, a number of used GPS satellites, a received strength of a GPS radio wave.

(Supplementary note 9) A radio terminal according to one of Supplementary note 1 to Supplementary note 7, said radio terminal comprising an OTDOA (Observed Time Difference Of Arrival) as a positioning means and calculating said positioning accuracy using at least one of a number of radio base stations detected by said radio terminal, a location of the radio base station detected by said radio terminal, a received electronic field strength of the radio wave that arrives from the radio base station, said received electronic field strength measured by said radio terminal, and a signal-to-noise ratio of the radio wave that arrives from the radio base station, said signal-to-noise ratio detected by said radio terminal.

(Supplementary note 10) A radio terminal that performs measurement based on a measurement condition to be indicated by a radio network, and reports a measurement result, comprising:
    positioning accuracy calculating means that calculates a positioning accuracy of the radio terminal; and
    measurement reporting controlling means that controls execution of at least one of the measurement and the reporting of said measurement result to the radio network by the radio terminal based on said calculated positioning accuracy.

(Supplementary note 11) A radio network in a radio communication system in which a radio terminal performs measurement based on a measurement condition to be indicated by the radio network and reports a measurement result, comprising a required positioning accuracy notifying means that notifies to the radio terminal a required positioning accuracy related to a positioning accuracy of the radio terminal, being a condition for controlling execution of at least one of the measurement and the reporting of said measurement result to the radio network by the radio terminal.

(Supplementary note 12) A radio network according to Supplementary note 11, wherein said required positioning accuracy notifying means changes the required positioning accuracy according to at least one of a reporting status from the radio terminal, a geographic factor, and an object to be measured by the radio terminal.

(Supplementary note 13) A radio network according to Supplementary note 12, wherein said required positioning accuracy notifying means changes the required positioning accuracy from a high positioning accuracy to a low positioning accuracy according to a decrease in a number of reports from the radio terminal.

(Supplementary note 14) A radio network according to Supplementary note 12 or Supplementary note 13, wherein said required positioning accuracy notifying means configures the required positioning accuracy based on a location in which the radio terminal or a radio base station is present or a geographic attribute thereof.

(Supplementary note 15) A radio network according to one of Supplementary note 11 to Supplementary note 14, wherein said positioning accuracy is at least one of:
    positioning accuracy calculated using at least one of a geometric arrangement of GPS satellites viewed from the radio terminal, a number of used GPS satellites, a received strength of a GPS radio wave; and
    positioning accuracy calculated using at least one of a number of radio base stations detected by said radio terminal, a location of the radio base station detected by said radio terminal, a received electronic field strength of the radio wave that arrives from the radio base station, said received electronic field strength measured by said radio terminal, and a signal-to-noise ratio of the radio wave that arrives from the radio base station, said signal-to-noise ratio detected by said radio terminal.

(Supplementary note 16) A radio communication system in which a radio terminal performs measurement based on a measurement condition to be indicated by the radio network and reports a measurement result:
    wherein the radio network comprises a required positioning accuracy notifying means that notifies to the radio terminal a required positioning accuracy related to a condition of a positioning accuracy for controlling execution of at least one of the measurement and the reporting of said measurement result to the radio network by the radio terminal; and
    wherein the radio terminal comprises:
        positioning accuracy calculating means that calculates a positioning accuracy of the radio terminal; and
        measurement reporting controlling means that compares said required positioning accuracy with said calculated positioning accuracy, and controls execution of at least one of the measurement and the reporting of said measurement result to the radio network by the radio terminal.

(Supplementary note 17) A radio communication system in which a radio terminal performs measurement based on a measurement condition to be indicated by the radio network and reports a measurement result, comprising:

positioning accuracy calculating means that calculates a positioning accuracy of the radio terminal; and measurement reporting controlling means that controls execution of at least one of the measurement and the reporting of said measurement result to the radio network by the radio terminal based on said calculated positioning accuracy.

(Supplementary note 18) A radio communication method of performing, by a radio terminal, measurement based on a measurement condition to be indicated by a radio network, and reporting, by a radio terminal, a measurement result, comprising:

notifying, by the radio network, a required positioning accuracy related to a condition of a positioning accuracy to the radio terminal; and calculating, by the radio terminal, the positioning accuracy of the radio terminal, comparing, by the radio terminal, said required positioning accuracy notified from said radio network with said calculated positioning accuracy, and controlling, by the radio terminal, execution of at least one of the measurement and the reporting of said measurement result to the radio network by the radio terminal.

(Supplementary note 19) A radio communication method according to Supplementary note 18, wherein said radio terminal does not report at least one part of said measurement result to the radio network when said calculated positioning accuracy does not satisfy said required positioning accuracy.

(Supplementary note 20) A radio communication method according to Supplementary note 18 or Supplementary note 19, wherein said radio terminal changes an interval of the reporting of said measurement result to the radio network when said calculated positioning accuracy does not satisfy said required positioning accuracy.

(Supplementary note 21) A radio communication method according to Supplementary note 20, wherein said radio terminal makes the interval of the reporting of said measurement result to the radio network long when said calculated positioning accuracy does not satisfy said required positioning accuracy.

(Supplementary note 22) A radio communication method according to one of Supplementary note 18 to Supplementary note 21, wherein said radio terminal does not measure at least one part of information when said calculated positioning accuracy does not satisfy said required positioning accuracy.

(Supplementary note 23) A radio communication method according to one of Supplementary note 18 to Supplementary note 22, wherein said radio terminal changes a measurement interval of the information when said calculated positioning accuracy does not satisfy said required positioning accuracy.

(Supplementary note 24) A radio communication method according to Supplementary note 23, wherein said radio terminal makes the measurement interval of the information long when said calculated positioning accuracy does not satisfy said required positioning accuracy.

(Supplementary note 25) A radio communication method according to one of Supplementary note 18 to Supplementary note 24, said radio terminal comprising a GPS (Global Positioning System) as a positioning means and calculating said positioning accuracy using at least one of a geometric arrangement of GPS satellites viewed from the radio terminal, a number of used GPS satellites, a received strength of a GPS radio wave.

(Supplementary note 26) A radio communication method according to one of Supplementary note 18 to Supplementary note 24, said radio terminal comprising an OTDOA (Observed Time Difference Of Arrival) as a positioning means and calculating said positioning accuracy using at least one of a number of radio base stations detected by said radio terminal, a location of the radio base station detected by said radio terminal, a received electronic field strength of the radio wave that arrives from the radio base station, said received electronic field strength measured by said radio terminal, and a signal-to-noise ratio of the radio wave that arrives from the radio base station, said signal-to-noise ratio detected by said radio terminal.

(Supplementary note 27) A radio communication method according to one of Supplementary note 18 to Supplementary note 26, wherein said radio network changes the required positioning accuracy according to at least one of a reporting status from the radio terminal, a geographic factor, and an object to be measured by the radio terminal.

(Supplementary note 28) A radio communication method according to one of Supplementary note 18 to Supplementary note 27, wherein said radio network changes the required positioning accuracy from a high positioning accuracy to a low positioning accuracy according to a decrease in a number of reports from the radio terminal.

(Supplementary note 29) A radio communication method according to one of Supplementary note 18 to Supplementary note 28, wherein said radio network configures the required positioning accuracy based on a location in which the radio terminal or a radio base station is present or a geographic attribute thereof.

(Supplementary note 30) A radio communication method of performing, by a radio terminal, measurement based on a measurement condition to be indicated by a radio network, and reporting, by a radio terminal, a measurement result, comprising:

calculating a positioning accuracy of the radio terminal; and controlling execution of at least one of the measurement and the reporting of said measurement result to the radio network by the radio terminal based on said calculated positioning accuracy.

(Supplementary note 31) A program of a radio terminal that performs measurement based on a measurement condition to be indicated by the radio network and reports a measurement result, causing the radio terminal to execute the processes:

calculating a positioning accuracy of the radio terminal; and comparing a required positioning accuracy related to a condition of the positioning accuracy with said calculated positioning accuracy, and controlling execution of at least one of the measurement and the reporting of said measurement result to the radio network by the radio terminal.

(Supplementary note 32) A program of an information processing device in a radio communication system in which a radio terminal performs measurement based on a measurement condition to be indicated by the radio network and reports a measurement result, causing said information processing device to execute a process of notifying to the radio terminal a required positioning accuracy related to a positioning accuracy of the radio terminal, being a condition for controlling execution of at least one of the measurement and the reporting of said measurement result to the radio network by the radio terminal.

This application is based upon and claims the benefit of priority from Japanese patent application No. 2010-02367, filed on Jan. 7, 2010, the disclosure of which is incorporated herein in its entirety by reference.

REFERENCE SIGNS LIST 1 radio terminal
2 radio base station
11 positioning unit
12 measurement reporting controller
13 transmitting unit
21 receiving unit
22 required positioning accuracy notifier
30 radio terminal (UE)
31 radio base station (eNB)
32 NM (Network Manager)

The invention claimed is:

1. A radio terminal that performs measurement based on a measurement condition to be indicated by a radio network, and reports a measurement result including at least a positioning result, comprising:
   a positioning unit that measures a location of said radio terminal;
   a positioning accuracy calculator that calculates a positioning accuracy of the measured location of said radio terminal;
   a required positioning accuracy maintaining unit that maintains a required positioning accuracy related to a condition of the positioning accuracy; and
   a measurement reporting controller that compares said required positioning accuracy with said calculated positioning accuracy, and controls, in accordance with the calculated position accuracy, execution of at least the reporting of said measurement result to the radio network by the radio terminal, in order to report only said measurement result including a positioning result satisfying said required positioning accuracy.

2. The radio terminal according to claim 1, wherein said measurement reporting controller does not report at least one part of said measurement result to the radio network when said calculated positioning accuracy does not satisfy said required positioning accuracy.

3. The radio terminal according to claim 1, wherein said measurement reporting controller changes an interval of the reporting of said measurement result to the radio network when said calculated positioning accuracy does not satisfy said required positioning accuracy.

4. The radio terminal according to claim 3, wherein said measurement reporting controller makes the interval of the reporting of said measurement result to the radio network long when said calculated positioning accuracy does not satisfy said required positioning accuracy.

5. The radio terminal according to claim 1, wherein said measurement reporting controller does not measure at least one part of information when said calculated positioning accuracy does not satisfy said required positioning accuracy.

6. The radio terminal according to claim 1, wherein said measurement reporting controller changes a measurement interval of the information when said calculated positioning accuracy does not satisfy said required positioning accuracy.

7. The radio terminal according to claim 6, wherein said measurement reporting controller makes the measurement interval of the information long when said calculated positioning accuracy does not satisfy said required positioning accuracy.

8. The radio terminal according to claim 1, said radio terminal comprising a GPS (Global Positioning System) as said positioning unit and calculating said positioning accuracy using at least one of a geometric arrangement of GPS satellites viewed from the radio terminal, a number of used GPS satellites, a received strength of a GPS radio wave.

9. The radio terminal according to claim 1, said radio terminal comprising an OTDOA (Observed Time Difference Of Arrival) as said positioning unit and calculating said positioning accuracy using at least one of a number of radio base stations detected by said radio terminal, the location of the radio base station measured by said radio terminal, a received electronic field strength of the radio wave that arrives from the radio base station, said received electronic field strength measured by said radio terminal, and a signal-to-noise ratio of the radio wave that arrives from the radio base station, said signal-to-noise ratio measured by said radio terminal.

10. The radio terminal according to claim 1, said radio terminal comprising a GPS (Global Positioning System) as said positioning unit and calculating said positioning accuracy using a geometric arrangement of GPS satellites viewed from the radio terminal.

11. A radio terminal that performs measurement based on a measurement condition to be indicated by a radio network, and reports a measurement result including at least a positioning result, comprising:
    a positioning unit that measures a location of said radio terminal;
    a positioning accuracy calculator that calculates a positioning accuracy of the measured location of said radio terminal; and
    a measurement reporting controller that controls, in accordance with the calculated position accuracy, execution of at least the reporting of said measurement result to the radio network by the radio terminal, in order to report only said measurement result including a positioning result satisfying said required positioning accuracy.

12. A radio network in a radio communication system in which a radio terminal performs measurement of a location of said radio terminal based on a measurement condition to be indicated by the radio network and reports, in accordance with a position accuracy of the measured location of said radio terminal, a measurement result including at least a positioning result, comprising a required positioning accuracy notifying unit that notifies to the radio terminal a required positioning accuracy related to the positioning accuracy of the radio terminal, being a condition for controlling execution of at least the reporting of said measurement result to the radio network by the radio terminal, in order to report only said measurement result including a positioning result satisfying said required positioning accuracy.

13. The radio network according to claim 12, wherein said required positioning accuracy notifying unit changes the required positioning accuracy according to at least one of a reporting status from the radio terminal, a geographic factor, and an object to be measured by the radio terminal.

14. The radio network according to claim 13, wherein said required positioning accuracy notifying unit changes the required positioning accuracy from a high positioning accuracy to a low positioning accuracy according to a decrease in a number of reports from the radio terminal.

15. The radio network according to claim 13, wherein said required positioning accuracy notifying unit configures the required positioning accuracy based on the location in which the radio terminal or a radio base station is present or a geographic attribute thereof.

16. The radio network according to claim 12, wherein said positioning accuracy is at least one of:
    positioning accuracy calculated using at least one of a geometric arrangement of GPS satellites viewed from the radio terminal, a number of used GPS satellites, a received strength of a GPS radio wave; and positioning accuracy calculated using at least one of a number of radio base stations detected by said radio terminal, the location of the radio base station measured by said radio terminal, a received electronic field strength of the radio wave that arrives from the radio base station, said received electronic field strength measured by said radio terminal, and a signal-to-noise ratio of the radio wave that arrives from the radio base station, said signal-to-noise ratio detected by said radio terminal.

17. A radio communication system in which a radio terminal performs measurement based on a measurement condition to be indicated by the radio network and reports a measurement result including at least a positioning result:
wherein the radio network comprises a required positioning accuracy notifying unit that notifies to the radio terminal a required positioning accuracy related to a condition of a positioning accuracy for controlling execution of at least the reporting of said measurement result to the radio network by the radio terminal; and
wherein the radio terminal comprises:
a positioning unit that measures a location of said radio terminal;
a positioning accuracy calculator that calculates a positioning accuracy of the measured location of said radio terminal; and
a measurement reporting controller that compares said required positioning accuracy with said calculated positioning accuracy, and controls, in accordance with the calculated position accuracy, execution of at least the reporting of said measurement result to the radio network by the radio terminal, in order to report only said measurement result including a positioning result satisfying said required positioning accuracy.

18. A radio communication system in which a radio terminal performs measurement based on a measurement condition to be indicated by the radio network and reports a measurement result including at least a positioning result, comprising:
a positioning unit that measures a location of said radio terminal;
a positioning accuracy calculator that calculates a positioning accuracy of the measured location of said radio terminal; and
a measurement reporting controller that controls, in accordance with the calculated position accuracy, execution of at least the reporting of said measurement result to the radio network by the radio terminal, in order to report only said measurement result including a positioning result satisfying said required positioning accuracy.

19. A radio communication method of performing, by a radio terminal, measurement based on a measurement condition to be indicated by a radio network, and reporting, by a radio terminal, a measurement result including at least a positioning result, comprising:
notifying, by the radio network, a required positioning accuracy related to a condition of a positioning accuracy to the radio terminal;

measuring, by the radio terminal, a location of said radio terminal; and
calculating, by the radio terminal, the positioning accuracy of the measured location of said radio terminal, comparing, by the radio terminal, said required positioning accuracy notified from said radio network with said calculated positioning accuracy, and controlling, by the radio terminal and in accordance with the calculated position accuracy, execution of at least the reporting of said measurement result to the radio network by the radio terminal, in order to report only said measurement result including a positioning result satisfying said required positioning accuracy.

20. A radio communication method of performing, by a radio terminal, measurement based on a measurement condition to be indicated by a radio network, and reporting, by a radio terminal, a measurement result including at least a positioning result, comprising:
measuring a location of said radio terminal;
calculating a positioning accuracy of the measured location of said radio terminal; and
controlling, in accordance with the calculated position accuracy, execution of at least the reporting of said measurement result to the radio network by the radio terminal, in order to report only said measurement result including a positioning result satisfying said required positioning accuracy.

21. A non-transitory computer readable storage medium storing a program of a radio terminal that performs measurement based on a measurement condition to be indicated by the radio network and reports a measurement result including at least a positioning result, causing the radio terminal to execute the processes:
measuring a location of said radio terminal;
calculating a positioning accuracy of the measured location of said radio terminal; and
comparing a required positioning accuracy related to a condition of the positioning accuracy with said calculated positioning accuracy, and controlling, in accordance with the calculated position accuracy, execution of at least the reporting of said measurement result to the radio network by the radio terminal, in order to report only said measurement result including a positioning result satisfying said required positioning accuracy.

22. A non-transitory computer readable storage medium storing a program of an information processing device in a radio communication system in which a radio terminal performs measurement of a location of said radio terminal based on a measurement condition to be indicated by the radio network and reports, in accordance with a position accuracy of the measured location of said radio terminal, a measurement result including at least a positioning result, causing said information processing device to execute a process of notifying to the radio terminal a required positioning accuracy related to the positioning accuracy of the radio terminal, being a condition for controlling execution of at least the reporting of said measurement result to the radio network by the radio terminal, in order to report only said measurement result including a positioning result satisfying said required positioning accuracy.

* * * * *